US010739981B2

(12) United States Patent
Kim et al.

(10) Patent No.: US 10,739,981 B2
(45) Date of Patent: Aug. 11, 2020

(54) TAG INPUT DEVICE OF ELECTRONIC DEVICE AND CONTROL METHOD THEREOF

(71) Applicant: Samsung Electronics Co., Ltd., Suwon-si, Gyeonggi-do (KR)

(72) Inventors: Jinsung Kim, Seoul (KR); Seo-Young Kim, Seoul (KR); Sang-Heon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/812,481

(22) Filed: Nov. 14, 2017

(65) Prior Publication Data

US 2018/0150199 A1 May 31, 2018

(30) Foreign Application Priority Data

Nov. 29, 2016 (KR) ........................ 10-2016-0160134

(51) Int. Cl.
| | |
|---|---|
| *G06F 17/00* | (2019.01) |
| *G06F 3/0486* | (2013.01) |
| *G06F 3/0488* | (2013.01) |
| *G06F 9/451* | (2018.01) |
| *G06F 3/0482* | (2013.01) |

(52) U.S. Cl.
CPC .......... *G06F 3/0486* (2013.01); *G06F 3/0482* (2013.01); *G06F 3/0488* (2013.01); *G06F 3/04886* (2013.01); *G06F 9/451* (2018.02)

(58) Field of Classification Search
CPC ............... G06F 17/3002; G06F 17/218; G06F 3/04847; G06F 3/0486
See application file for complete search history.

(56) References Cited

U.S. PATENT DOCUMENTS

| | | | |
|---|---|---|---|
| 2007/0028171 A1* | 2/2007 | MacLaurin | ........... G06F 3/0482 715/705 |
| 2008/0263103 A1* | 10/2008 | McGregor | .......... G06F 21/6218 |
| 2010/0081475 A1* | 4/2010 | Chiang | ................. G06F 3/0483 455/564 |

(Continued)

FOREIGN PATENT DOCUMENTS

KR    10-2006-0084608 A    7/2006

OTHER PUBLICATIONS

Direct Annotation, Shneiderman and Kang, 2000, IEEE, p. 88-95.*
European Search Report dated Apr. 19, 2018, issued in European Application No. 17204156.8-1224.

*Primary Examiner* — Andrew T McIntosh
(74) *Attorney, Agent, or Firm* — Jefferson IP Law, LLP

(57) ABSTRACT

A method of an electronic device is provided. The electronic device includes a display, a memory storing instructions, and at least one processor electrically coupled with the display and the memory. The at least one processor is configured to control to display at least one content in a first area, control display a first tag mapped to a first content in a second area, in response to detecting an input on the first content included in the at least one content, control to display a second tag distinguished from the first tag, in a third area, and map the second tag to the first content, in response to detecting an input to move the second tag to the second area, the second tag being displayed in the third area.

18 Claims, 17 Drawing Sheets

(56) References Cited

U.S. PATENT DOCUMENTS

| | | | |
|---|---|---|---|
| 2010/0138767 A1* | 6/2010 | Wang | G06F 3/0481 |
| | | | 715/769 |
| 2012/0290960 A1* | 11/2012 | Kim Yeung | G06F 3/04817 |
| | | | 715/765 |
| 2013/0054601 A1* | 2/2013 | Whitlock | G06F 17/30342 |
| | | | 707/737 |
| 2014/0359505 A1* | 12/2014 | Cisler | G06F 16/144 |
| | | | 715/769 |

* cited by examiner

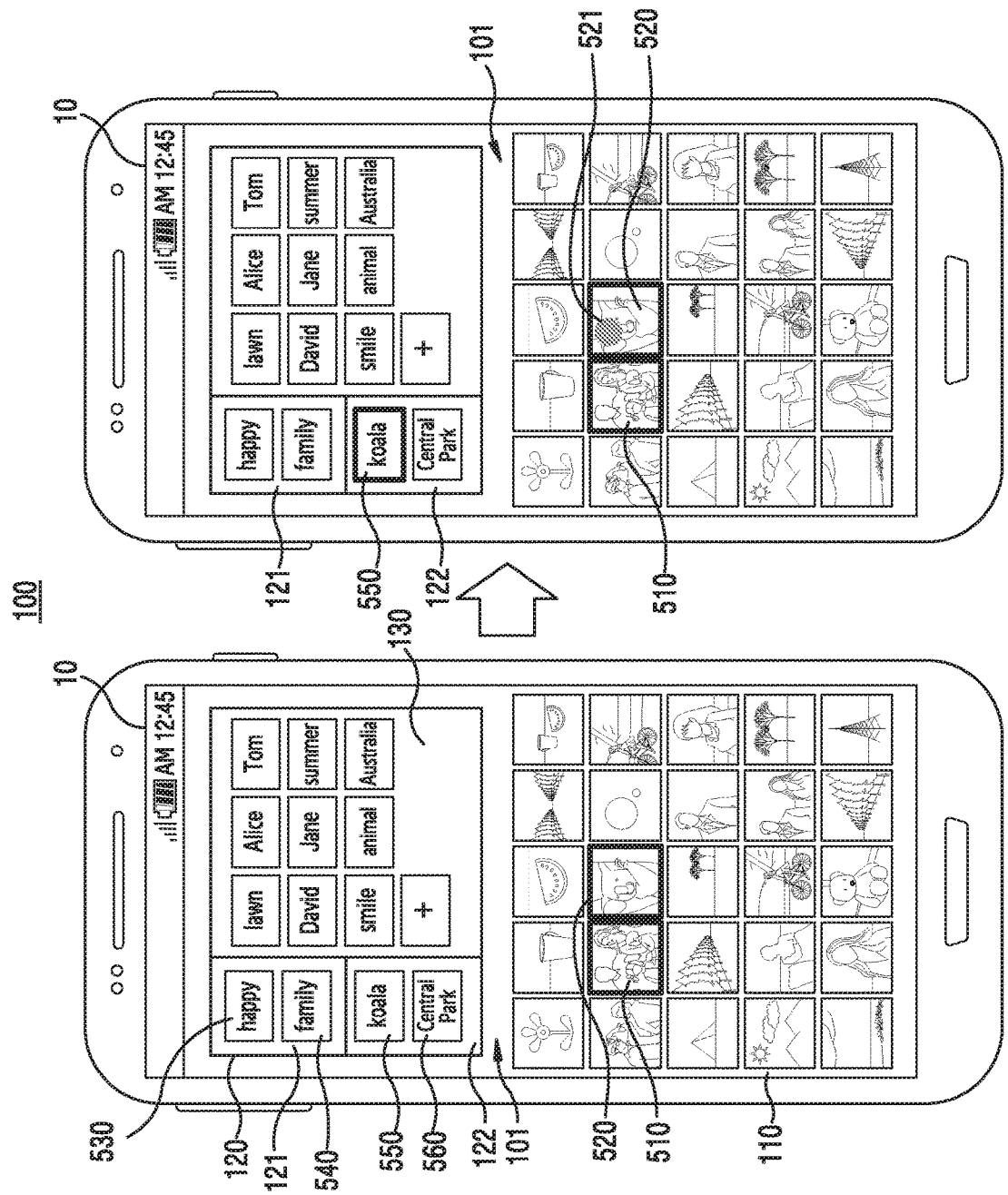

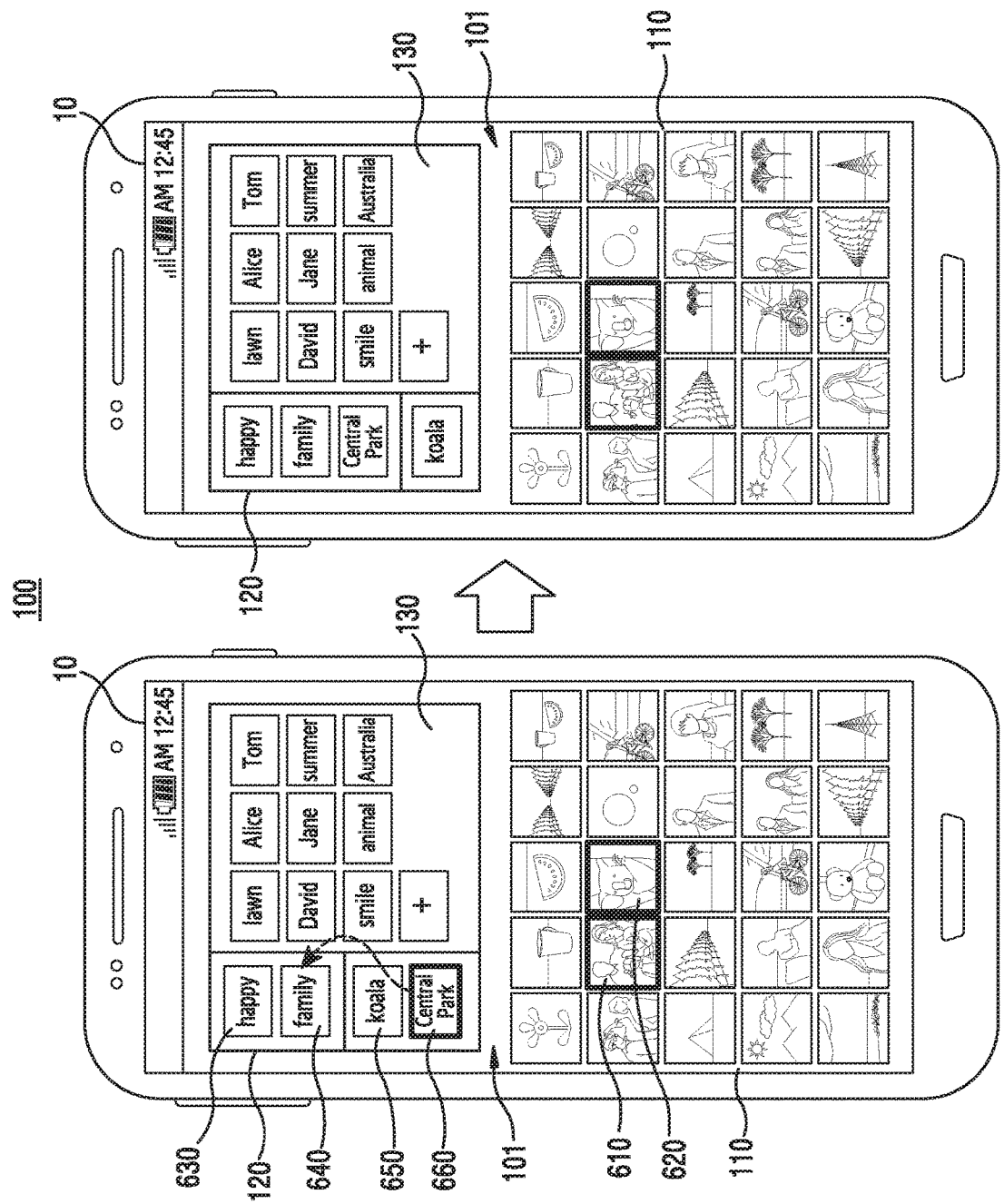

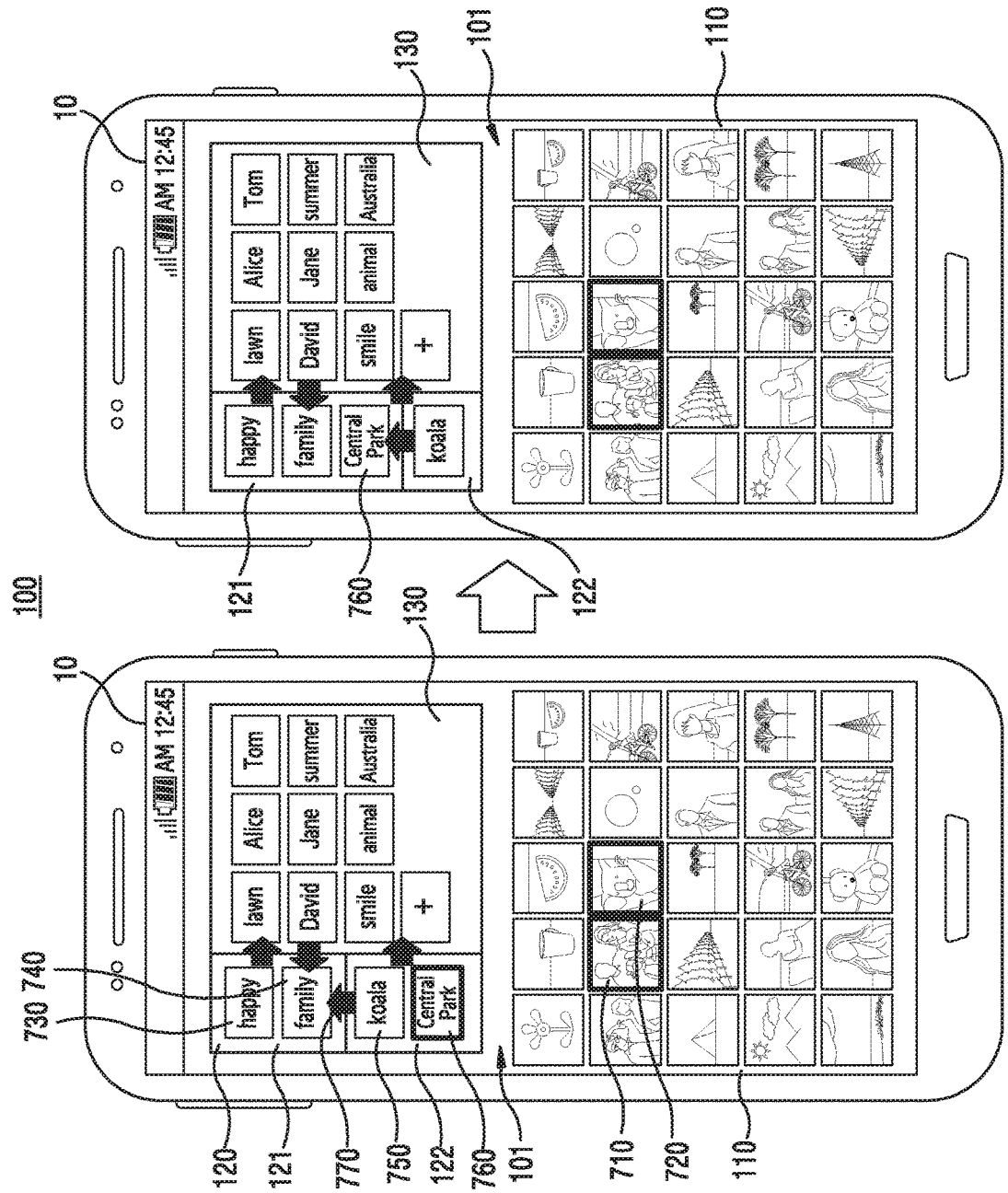

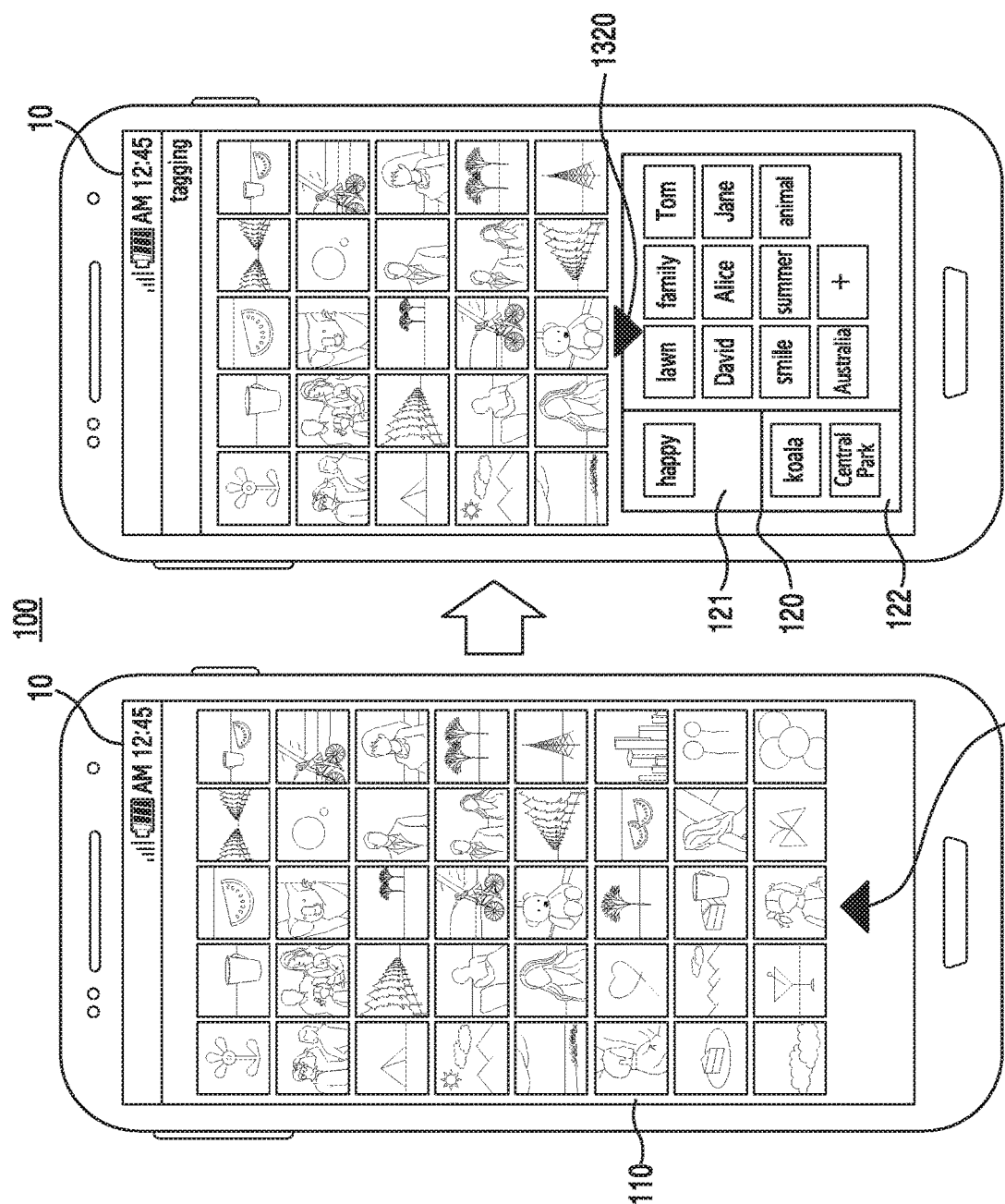

TAG INPUT DEVICE OF ELECTRONIC DEVICE AND CONTROL METHOD THEREOF

CROSS-REFERENCE TO RELATED APPLICATION(S)

This application claims the benefit under 35 U.S.C. § 119(a) of a Korean patent application filed on Nov. 29, 2016 in the Korean Intellectual Property Office and assigned Serial number 10-2016-0160134, the entire disclosure of which is hereby incorporated by reference.

TECHNICAL FIELD

The present disclosure relates to an electronic device that displays a tag input user interface, and a controlling method thereof. More particularly, the present disclosure relates to a tag input device of an electronic device that controls inputting a tag using a first area, a second area, and a third area, and a controlling method thereof.

BACKGROUND

Portable electronic devices, such as smart phones, tablet personal computers (PCs), and the like, generate or download from an external electronic device and store various content, for example, audio files, video files, documents, images, text, and the like.

A user uploads stored content to a social networking service (SNS) application or the like. In this instance, the user may input the feature of the uploaded content as a tag. The user may readily search for the uploaded content from the SNS application using the input tag.

The above information is presented as background information only to assist with an understanding of the present disclosure. No determination has been made, and no assertion is made, as to whether any of the above might be applicable as prior art with regard to the present disclosure.

SUMMARY

A user may use a character input user interface for inputting a tag to content. However, the user may need to input a tag to each piece of content in order to input tags to a plurality of contents, which is inconvenient for the user. Also, the user may need to correct each content when correcting tags included in the plurality of content, which is also inconvenient for the user.

Aspects of the present disclosure are to address at least the above-mentioned problems and/or disadvantages and to provide at least the advantages described below. Accordingly, an aspect of the present disclosure is to provide a method and an apparatus for readily and quickly tagging a large amount of content through recommendation by using different user interfaces.

In accordance with an aspect of the present disclosure, an electronic device is provided. The electronic device includes a display, a memory storing instructions, and at least one processor electrically coupled with the display and the memory. The processor is configured to control to display at least one content in a first area, control to display a first tag mapped to a first content in a second area, in response to detecting an input on the first content included in the at least one content, control to display a second tag distinguished from the first tag, in a third area, and map the second tag to the first content, in response to detecting an input to move the second tag to the second area, the second tag being displayed in the third area.

In the electronic device according to various embodiments of the present disclosure, the at least one processor is configured to execute the instructions to release mapping between the first tag and the first content, in response to detecting an input to move the first tag to the third area, the first tag being displayed in the second area.

In the electronic device according to various embodiments of the present disclosure, wherein the second area includes second area-1 and second area-2, and the at least one processor is further configured to execute the instructions to control to display, in the second area-1, a tag regarding a plurality of contents, in response to detecting an input on the plurality of contents included in at least one content displayed in the first area, and control to display, in the second area-2, another tag that is not included in the plurality of contents.

In the electronic device according to various embodiments of the present disclosure, wherein the at least one processor is configured to execute the instructions to map the tag related to the second area-2 to the plurality of contents, in response to detecting another input to move the tag related to the second area-2 to the second area-1.

In the electronic device according to various embodiments of the present disclosure, wherein the at least one processor is configured to execute the instructions to control to display a notification associated with content mapped to the tag related to the second area-2, in response to detecting another input to select the tag related to the second area-2.

In the electronic device according to various embodiments of the present disclosure, wherein the second area or the third area is overlappingly displayed on the first area.

In the electronic device according to various embodiments of the present disclosure, wherein the at least one processor is configured to execute the instructions to extend the second area or the third area, in response to detecting an input to reduce the first area.

In the electronic device according to various embodiments of the present disclosure, wherein the at least one processor is configured to execute the instructions to change a display mode of the electronic device, in response to detecting a designated movement of the electronic device, and change a location of at least one of the first area, the second area, or the third area displayed in the display, based on change of the display mode.

In the electronic device according to various embodiments of the present disclosure, wherein the second tag displayed in the third area is a tag related to the first content.

In the electronic device according to various embodiments of the present disclosure, wherein the tag related to the first content is at least one of a tag previously designated through a designated application, a tag that is used at least a predetermined number of times designated by a user of the electronic device, a tag generated by the user of the electronic device, a tag related to a feature of the first content, or a tag generated by users who use the designated application.

In accordance with another aspect of the present disclosure, an electronic device control method is provided. The method includes displaying at least one content in a first area, displaying a first tag mapped to a first content in a second area, in response to detecting an input on the first content included in the at least one content, displaying a second tag distinguished from the first tag, in a third area, and mapping the second tag to the first content, in response to detecting an input to move the second tag to the second area, the second tag being displayed in the third area.

In accordance with another aspect of the present disclosure, the electronic device control method is provided. The method includes releasing mapping between the first tag and the first content, in response to detecting an input to move the first tag to the third area, the first tag being displayed in the second area.

In an electronic device control method according to various embodiments of the present disclosure, wherein the second area includes second area-1 and the second area-2, and the method further includes displaying, in the second area-1, a tag regarding a plurality of contents, in response to detecting an input on the plurality of contents included in at least one content displayed in the first area, and displaying, in the second area-2, another tag that is not included in the plurality of contents.

In accordance with another aspect of the present disclosure, the electronic device control method includes mapping the tag related to the second area-2 to the plurality of contents, in response to detecting another input to move the tag related to the second area-2 to the second area-1.

The electronic device control method according to various embodiments of the present disclosure, the method further includes displaying a notification associated with content mapped to the tag related to the second area-2, in response to detecting another input to select the tag related to the second area-2.

In accordance with another aspect of the present disclosure, the electronic device control method includes that the second area or the third area is overlappingly displayed on the first area.

In accordance with another aspect of the present disclosure, the electronic device control method includes extending the second area or the third area, in response to detecting an input to reduce the first area.

In accordance with another aspect of the present disclosure, the electronic device control method includes changing a display mode of the electronic device, in response to detecting a designated movement of the electronic device, and changing a location of at least one of the first area, the second area, or the third area displayed in the display, based on change of the display mode.

In the electronic device control method according to various embodiments of the present disclosure, wherein the tag related to the first content is at least one of a tag previously designated through a designated application, a tag which is used at least a predetermined number of times designated by a user of the electronic device, a tag generated by the user of the electronic device, a tag related to a feature of the first content, or a tag generated by users who use the designated application.

A non-transitory computer readable storage medium storing instructions, that when executed by at least one processor of an electronic device, causes the at least one processor to control to display at least one content in a first area, control to display a first tag mapped to a first content in a second area, in response to detecting an input on the first content included in the at least one content, control to display a second tag distinguished from the first tag, in a third area, and map the second tag to the first content, in response to detecting an input to move the second tag to the second area, the second tag being displayed in the third area.

A tag input device of an electronic device and a controlling method thereof according to various embodiments of the present disclosure may display a first area, display at least one content in the first area, displays, in a second area, a tag included in content, which is selected based on a signal input for selecting at least one content from contents displayed in the first area, displays, in a third area, a tag that is not included in the content selected in the first area, and adds, to the selected content, a tag that is moved based on a signal for moving the tag displayed in the third area to the second area.

Therefore, a user can readily add and remove to/from a tag to content by simply moving the tag in the display, thereby readily and promptly tagging a large amount of content.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A and 5B are diagrams illustrating a situation in which, when a tag that is not included in all of a plurality of contents is selected, content including the corresponding tag is indicated in an electronic device according to various embodiments of the present disclosure;

FIGS. 6A and 6B are diagrams illustrating a situation of adding tags, which have been respectively and exclusively included in a plurality of contents, to the plurality of contents in an electronic device according to various embodiments of the present disclosure;

FIGS. 7A and 7B are diagrams illustrating another method for moving a tag in an electronic device according to various embodiments of the present disclosure;

FIGS. 11A, 11B, 12A, 12B, 13A, and 13B are diagrams illustrating other examples of displaying a tag input user interface using an electronic device according to various embodiment of the present disclosure;

Throughout the drawings, like reference numerals will be understood to refer to like parts, components, and structures.

DETAILED DESCRIPTION

Figure 1C:
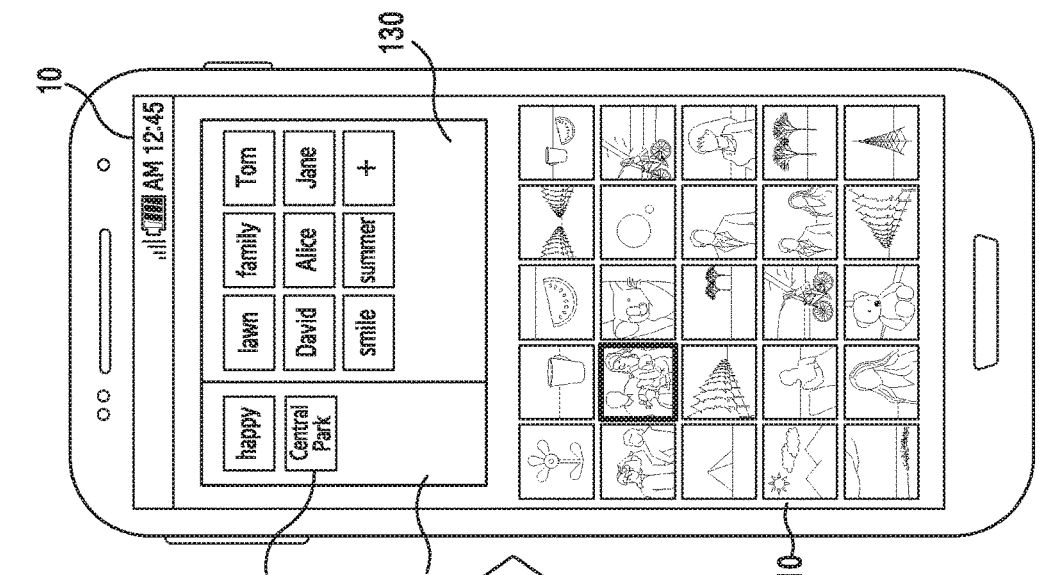
FIGS. 1A, 1B, and 1C are diagrams illustrating a tag input user interface in an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the present disclosure will be described with reference to the accompanying drawings. The various embodiments and the terms used therein are not intended to limit the technology disclosed herein to specific forms, and should be understood to include various modifications, equivalents, and/or alternatives to the corresponding various embodiments. In describing the drawings, similar reference numerals may be used to designate similar constituent elements. The expression "a first", "a second", "the first", or "the second" may modify corresponding elements regardless of the order or importance, and is used only to distinguish one element from another element, but does not limit the corresponding elements. When an element (e.g., first element) is referred to as being "(functionally or communicatively) connected," or "directly coupled" to another element (second element), the element may be connected directly to another element or connected to another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

In the present document, a terminology "tag included in content" may be used interchangeably with a "tag related to content", a "tag mapped to content", and a "tag indicating content" depending on a situation. The relationship between a tag and content can be expressed by various terminologies indicating that a tag expresses information associated with content, and the terminologies may not be limited to the above described examples.

Figure 1B:
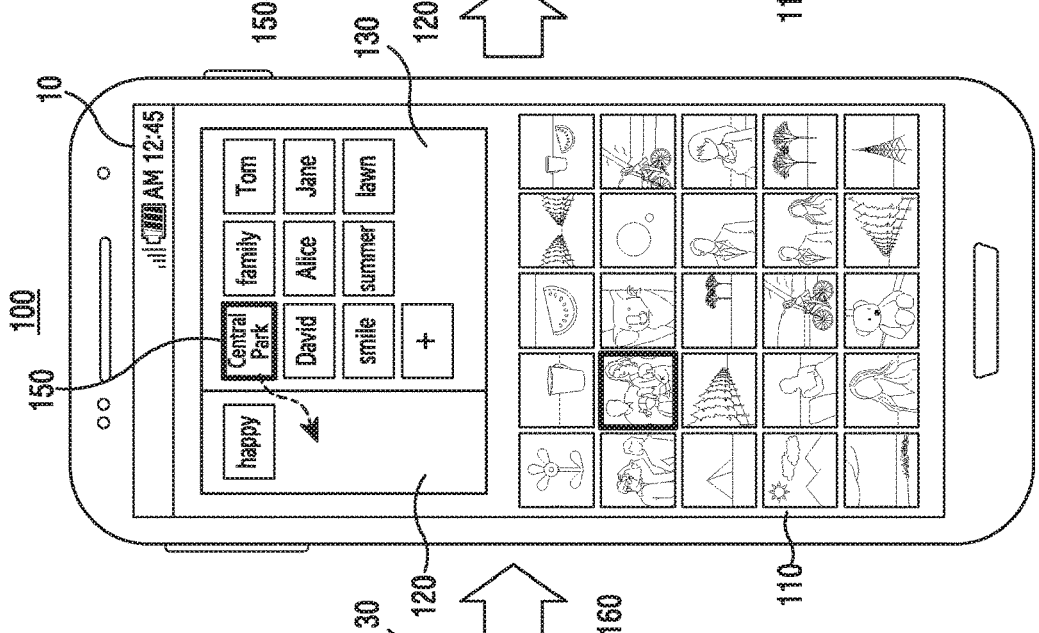
Figure 1A:
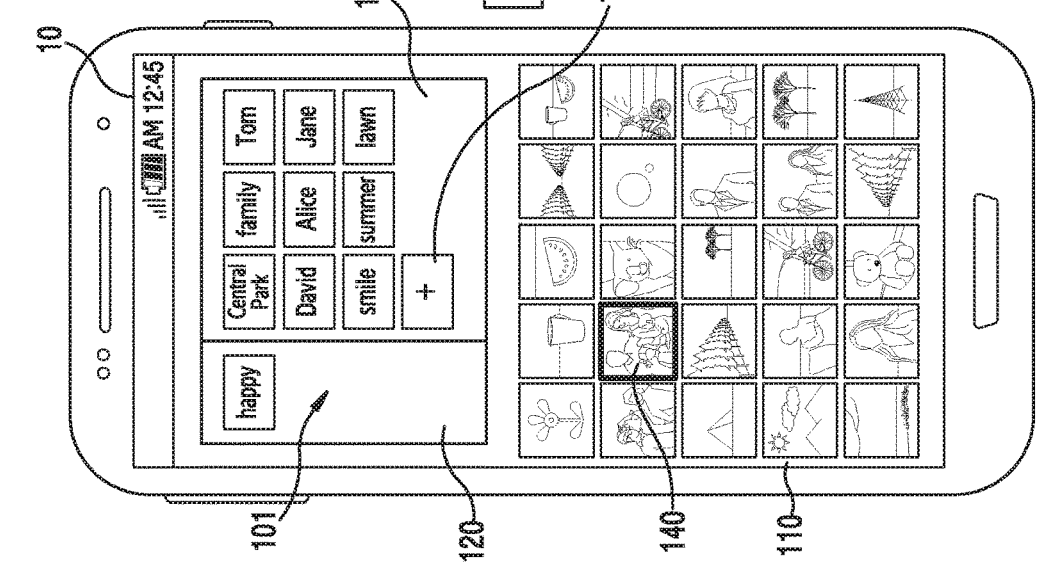

FIGS. 1A, 1B, and 1C are diagrams illustrating a tag input user interface in an electronic device according to various embodiments of the present disclosure.

Referring to FIGS. 1A, 1B, and 1C, an electronic device 100 according to an embodiment may include at least one of, for example, a smart phone, a tablet personal computer (PC), a mobile phone, a video phone, an e-book reader, a desktop PC, a laptop PC, a netbook computer, a workstation, a server, a personal digital assistants (PDA), a portable multimedia player (PMP), an moving picture experts group (MPEG-1 or MPEG-2) audio layer-3 (MP3) player, a medical device, a camera, and a wearable device. The wearable device may include at least one of an accessory-type device (e.g., a watch, a ring, a bracelet, an ankle bracelet, a necklace, glasses, contact lens, or a head-mounted-device (HMD)), a material or clothes-integrated type device (e.g., electronic clothes), a skin-mounted type (e.g., skin pad or tattoo), and a transplant-type circuit. Hereinafter, descriptions will be provided by assuming that the electronic device 100 is a smart phone.

Referring to FIG. 1A, the electronic device 100 may display a tag input user interface 101 in a display 10. The electronic device 100 may read data stored in advance in a memory, and display the tag input user interface 101 in the display 10. Also, the electronic device 100 may download data from an external electronic device (e.g., a server, another electronic device, or the like) capable of communicating with the electronic device 100, and may display the tag input user interface 101 in the display 10. Detailed descriptions of the tag will be provided with reference to FIG. 3.

The tag input user interface 101 may be used, for example, when content is uploaded to or downloaded from a social networking service (SNS) application (not illustrated). For example, a user may newly upload an image to the SNS application, and at the same time or sequentially, may input a tag to the image. In this instance, the electronic device 100 may display the tag input user interface 101 based on a signal input for inputting a tag from a user.

According to an embodiment, the tag input user interface 101 for inputting tag information may include a first area 110, a second area 120, and a third area 130.

The first area 110 may be an area in which various examples of contents may be displayed. For example, the electronic device 100 may display, in the first area 110, image files, video files, music files, or the like stored in the electronic device 100. According to various embodiments, the electronic device 100 may display image files, video files, music files, and the like stored in another electronic device. For example, the electronic device 100 establishes communication with a cloud, an external server device, or an adjacent electronic device using a communication module, receives content stored in the cloud or the external server, and displays the content in the display 10. The electronic device 100 may display a first frame in the first area 110 in the case of a video file, and may display an album art in the first area 110 in the case of a music file.

According to an embodiment, a user may select various examples of contents displayed in the first area 110. For example, the user may touch content displayed in the first area 110 to select the same, or may select the content displayed in the first area 110 using a physical key separately provided in the electronic device 100. However, this may not be limited thereto.

A user may select one piece of content, or may select a plurality of contents at once. For example, the user may select a plurality of contents at once by sequentially touching each content. As another example, the user may select a plurality of contents located inside a closed line at once by touching the inside of the first area 110 and drawing the closed line. However, this may not be limited thereto.

The electronic device 100 may display the content selected in the first area 110 to be distinguished from other content. Referring to FIG. 1A, the electronic device 100 may display content 140 selected by a user to have a thick border. However, this may not be limited thereto. For example, the electronic device 100 may display the border of the selected content 140 in another color. The selected content 140 may be displayed to be more blurred or clearer than other content.

According to an embodiment, the electronic device 100 may display a tag in the second area 120. That is, the electronic device 100 may display, in the second area 120, a tag included in the content that a user selects in the first area 110. When a plurality of tags exists, the electronic device 100 displays the tags in a list. When a tag is not included in (or not related or mapped to) the content that the user selects in the first area 110, the electronic device 100 may not display the tag in the second area 120.

Referring to FIG. 1A, the tag included in the content 140 selected in the first area 110 may be displayed in the second area 120. The electronic device 100 may display characters "Happy" in the second area 120, as a tag. The "Happy" tag may be, for example, a tag that is input, in advance, to the selected content 140 by the user.

According to an embodiment, the electronic device 100 may display a tag in the third area 130. The electronic device 100 may display, in the third area 130, a tag which is determined to be related to the content that the user selects in the first area 110. The tag determined to be related to the content may be at least one of, for example, a tag classified (or designated) in advance through an SNS application that executes the tag input user interface 101, a tag used for mapping at least a predetermined number of times designated by a user, a tag directly generated by the user, a tag generated through analysis of content selected in the first area 110, and a tag generate by other users who use the SNS application which drives the tag input user interface 101.

For example, when the content is an image, the tag generated through the analysis of the content selected in the first area 110 may include a tag similar to a location, a time, a composition, a set value, and the like associated with photographing an image.

According to various embodiments, the electronic device 100 may receive a tag from another electronic device or an external server, and display the same in the third area 130. That is, the electronic device 100 may generate, in the third area 130, a tag related to the content selected in the first area 110 by using data stored in the electronic device 100, and at the same time, may transmit information associated with the content selected in the first area 110 to an external electronic device, receive a tag which is generated by the external electronic device through analysis, and display the same in the third area 130.

Referring to FIG. 1B, the electronic device 100 may add, to the content 140 selected in the first area 110, a tag that is moved based on a signal input for moving the tag located in the third area 130 to the second area 120.

For example, the user may select a "central park" tag from among tags displayed in the third area 130. The user may touch a tag displayed in the third area 130 to select the same, or may select the tag displayed in the third area 130 using a physical key separately provided in the electronic device 100. The user may select a tag, or may select a plurality of tags at once. For example, the user sequentially touches tags to select the plurality of tags at once. As another example, the user may select a plurality of tags inside a closed line at once by touching the inside of the third area 130 and drawing the closed line. However, this may not be limited thereto.

The electronic device 100 may display the selected tag to be distinguished from another tag, in the third area 130. Referring to FIG. 1B, the electronic device 100 may display a tag 150 selected by the user to have a thick border. However, this may not be limited thereto. For example, the electronic device 100 may display the border of the selected content in another color, and may display the selected content to be more blurred or clearer than other content.

The user may move the tag 150 to the second area 120. For example, the user may touch the "central park" tag 150, and drag the "central park" tag 150 to the second area 120. However, this may not be limited thereto. The user may select the "central park" tag 150 using a physical key separately provided in the electronic device 100, and move the same to the second area 120. Also, the electronic device 100 may display a user interface through which movement of the "central park" tag to the second area 120 is identified, based on a signal provided when a user long-touches the "central park" tag 150 displayed in the third area 130.

Referring to FIG. 1C, the electronic device 100 may display, in the second area 120, the tag 150 which has been moved from the third area 130 to the second area 120. In this instance, the electronic device 100 may add (or map) the tag 150 having moved to the second area 120 as a tag of the content 140 selected in the first area 110.

According to various embodiments, the electronic device 100 may display the tag located in the second area 120, in the third area 130, based on a signal for moving the tag located in the second area 120 to the third area 130. However, this may not be limited thereto. For example, the electronic device 100 may display a user interface through which the movement of a "Happy" tag to the third area 130 is identified, based on a signal provided when a user long-touches the "Happy" tag displayed in the second area 120.

Upon the movement of a tag located in the second area 120 to the third area 130, the electronic device 100 may delete the tag included in (related or mapped to) the content 140 selected in the first area 110. That is, the electronic device 100 may remove the "Happy" tag (or release mapping) included in the content 140 selected in the first area 110.

According to an embodiment, the electronic device 100 may generate and add a new tag based on a user input for adding a tag. For example, the electronic device may display a pop-up window through which a character is input, upon selecting a tag-add-icon 160. By using a popup window that displays a user interface through which a user may input a character, the user may input (or map) a new tag to content selected in the first area 110.

According to the above described methods, the electronic device 100 may display the tag input user interface 101 including the first area 110, the second area 120, and the third area 130. Accordingly, the user may identify a tag included in desired content, and newly input (or map) a desired tag or removes a tag (or release mapping). Also, the user may readily generate and input a tag that the electronic device 100 does not suggest.

According to various embodiments, the electronic device 100 may include a display, a memory storing instructions, and at least one processor. The at least one processor may be connected with the display and the memory, and may be configured to implement the instructions to perform: displaying at least one piece of content in the first area 110; displaying a first tag mapped to a first content in the second area 120 based on an input for the first content included in the at least one piece of content; displaying a second tag distinguished from the first tag in the third area 130; and mapping the second tag to the first content, upon detection of an input for moving the second tag displayed in the third area 130 to the second area 120.

Figure 2:
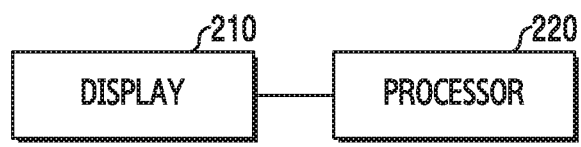
FIG. 2 is a block diagram schematically illustrating the configuration of an electronic device according to various embodiments of the present disclosure.

FIG. 2 is a block diagram schematically illustrating the configuration of an electronic device according to various embodiments of the present disclosure.

Referring to FIG. 2, the electronic device 100 may include a display (or display device) 210 and a processor 220. The electronic device 100 may be embodied to include more or fewer elements than the elements illustrated in FIG. 2. For example, the electronic device 100 may be configured to include an input module (e.g., a touch panel, a physical key, a proximity sensor, a biometric sensor, or the like), or a power supply unit, and the like. Also, the electronic device 100 may be configured to include a memory for storing instructions or data related to at least one other elements of the electronic device 100.

The display 210 may include, for example, a liquid crystal display (LCD), a light emitting diode (LED) display, an organic LED (OLED) display, a micro electro mechanical system (MEMS) display, or an electronic paper display. For example, the display 210 may include the display 190 of FIG. 1. The display 210 may include a touch screen, and may receive, for example, a touch, gesture, proximity, or hovering input using an electronic pen or the user's body part.

The display 210 according to an embodiment may read data stored in the memory under the control of the processor 220, and may display a tag input user interface. Also, the display 210 may change the location of a tag or content displayed in the tag input user interface, and display the same under the control of the processor 220.

The processor 220 may control a plurality of hardware or software elements connected thereto and may perform various data processing and operations by driving an operating system (OS) or an application program.

The processor 220 according to an embodiment may display a tag input user interface in the display 210 using data stored in advance in the memory. However, this may not be limited thereto. For example, the processor 220 may receive data from an external electronic device or a server through a communication unit, and display a tag input user interface in the display 210.

The processor 220 may store a tag that is moved based on an external input signal which moves a tag existing in a third area included in the tag input user interface to a second area, as a tag for content selected in a first area.

Figure 3:
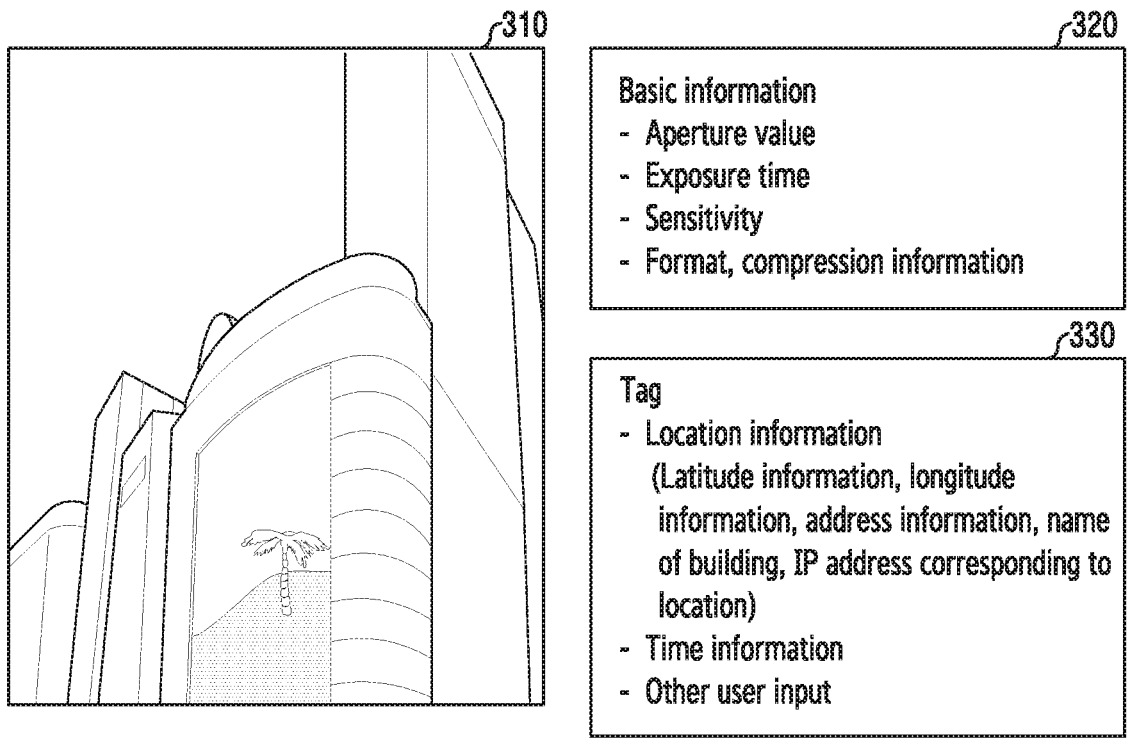
FIG. 3 is a diagram illustrating a tag according to various embodiments of the present disclosure.

FIG. 3 is a diagram illustrating a tag according to various embodiments of the present disclosure.

A tag may be, for example, a keyword or a classification assigned to predetermined information or content. The tag may be, for example, text data, image data, audio data, a document, or video data. Unlike the normal classification system, many tags may be assigned to predetermined information or content, whereby association with the information or content may be expressed in many aspects. Also, the assigned keyword or classification may enable the corresponding information or content to be readily retrieved, and may readily relate the information or content to other materials.

The tag may be stored in metadata of content. For example, the tag may be stored in the header of an image file in the joint photographic experts group (JPEG) format. However, this may not be limited thereto. For example, the tag may be stored by being linked to content. For example, when a tag is input to an image or a video using an SNS application, the tag may be actually stored in the SNS application, or may be actually stored by being linked to an image or video updated using the SNS application.

Referring to FIG. 3, an image file may include, for example, an original image 310, basic information 320, and a tag 330. However, this may not be limited thereto. For example, the image file may further include various factors related to the image, such as a thumbnail image, a screen nail image, and the like.

The original image 310 may be, for example, an original image photographed by a photographing device.

The basic information 320 may include a set value used when the photographing device photographs the original image 310 (e.g., an aperture value, an exposure time, sensitivity, an image file format, compressed information, or the like). The tag 330 may include location information (e.g., the latitude, the longitude, an address, the name of a building, an internet protocol (IP) address corresponding to the location, and the like) of a photographing device at the point in time when the photographing device photographs the original image 310, time information, and other information input by a user. According to an embodiment, the user may input the above described basic information 320 as a tag 330.

The tag according to various embodiments may be stored in a content file, or may be stored in a separate storage medium by being linked to content as described in FIG. 2. For example, the tag may be stored in a server operated by a company that manufactures an SNS application, or may be stored in a separate space in a memory of the electronic device 100.

Figure 4C:
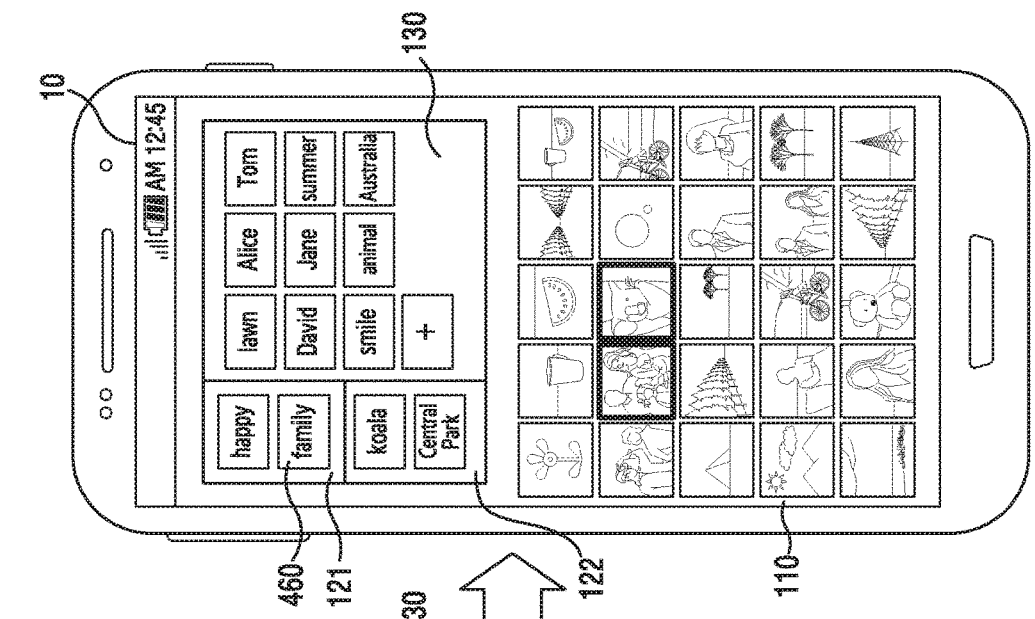
FIGS. 4A, 4B, and 4C are diagrams illustrating a situation of displaying a tag input user interface and inputting tags to a plurality of contents in an electronic device according to various embodiments of the present disclosure.
Figure 4B:
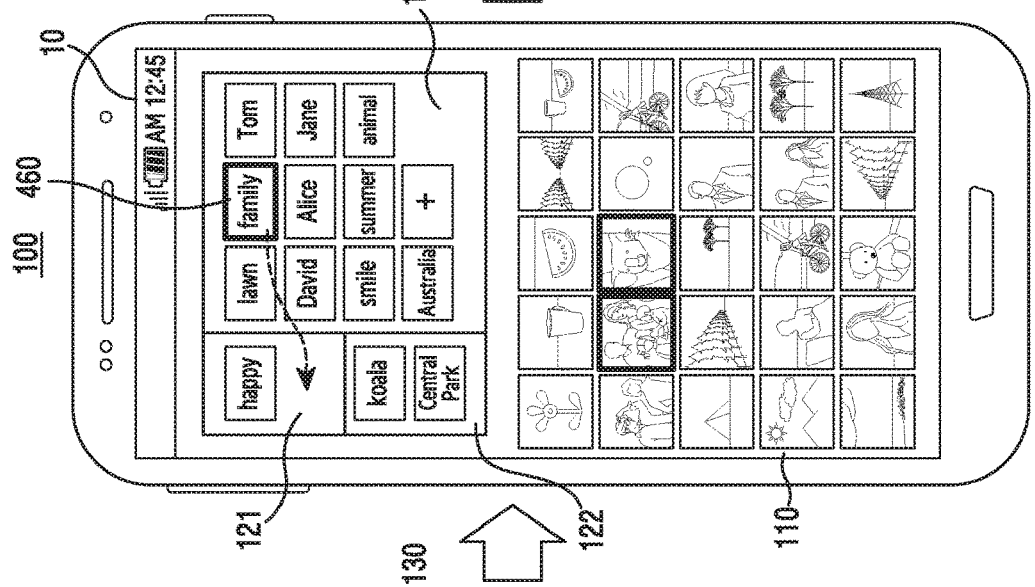
Figure 4A:
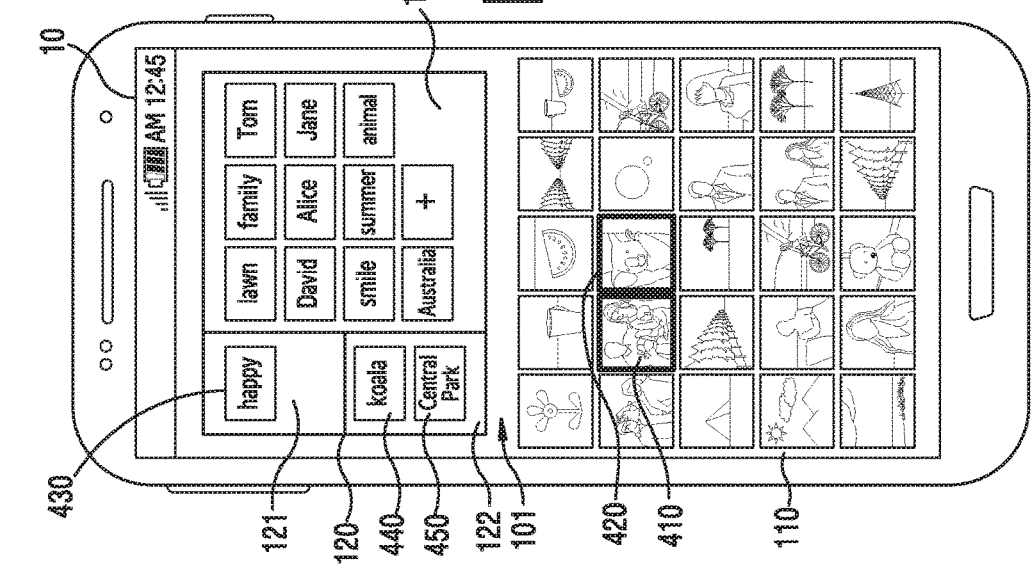

FIGS. 4A, 4B, and 4C are diagrams illustrating a situation of displaying a tag input user interface and inputting tags to a plurality of contents in an electronic device according to various embodiments of the present disclosure.

Referring to FIG. 4A, the electronic device 100 may display the tag input user interface 101 in the display 10. According to an embodiment, the tag input user interface 101 for inputting tag information may include the first area 110, the second area 120, and the third area 130. According to various embodiments, the second area 120 may include second area-1 121 and second area-2 122.

The first area 110 may be an area in which various pieces of content may be displayed. For example, the electronic device 100 may display, in the first area 110, image files, video files, music files, or the like stored in the electronic device 100.

According to an embodiment, a user may select various pieces of content displayed in the first area 110. The user may select a piece of content, or may select a plurality of contents at once. For example, the user may select a plurality of contents at once by sequentially touching each piece of content. The user may select a plurality of contents located inside a closed line at once by touching the inside of the first area 110 and drawing the closed line. However, this may not be limited thereto.

The electronic device 100 may display the selected content to be distinguished from another piece of content, in the first area 110. Referring to FIG. 4A, the electronic device 100 may display content 410 and 420 selected by the user to have a thick border.

According to an embodiment, the electronic device 100 may display, in the second area 120, tags included in the content 410 420 selected in the first area 110.

When a plurality of contents is selected in the first area 110, the electronic device 100 may distinguish and display, in the second area 120, tags commonly included in the plurality of pieces of content 410 and 420 and tags respectively and exclusively included in the plurality of pieces of content 410 and 420. For example, the electronic device 100 may display, in the second area-1 121, a "Happy" tag 430 that is commonly included in the content 410 and 420 selected in the first area 110. Also, the electronic device 100 may display, in the second area-2 122, a "Central park" tag 450 and a "Koala" tag 440 that are respectively and exclusively included in the content 410 and 420 selected in the first area 110.

According to an embodiment, the electronic device 100 may display a tag in the third area 130. The electronic device 100 may display, in the third area 130, a tag which is determined to be related to the content that the user selects in the first area 110. The tag that is determined to be related to the content may be, for example, a tag that is classified in advance by an SNS application that drives the tag input user interface 101, a tag that is frequently added by a user, a tag that the user directly generates, a tag generated through analysis of content, or a tag frequently generated by other users who use the SNS application that drives the tag input user interface 101.

Referring to FIG. 4B, the electronic device 100 may add, to the plurality of pieces of content 410 and 420 selected in the first area 110, a tag that is moved based on a signal input for moving a tag located in the third area 130 to the second area 121.

For example, the user may select a "family" tag 460 from among tags displayed in the third area 130. The user may touch a tag displayed in the third area 130 to select the same, or may select the tag displayed in the third area 130 using a physical key separately provided in the electronic device 100.

The electronic device 100 may display the selected tag 460 to be distinguished from other tags, in the third area 130. Referring to FIG. 4B, the electronic device 100 may display a tag selected by a user to have a thick border.

The user may move the selected tag to the second area-1 121. For example, the user may touch the "family" tag 460 and drag the same to the second area-1 121.

Referring to FIG. 4C, the electronic device 100 may display the tag 460 which has been moved from the third area 130 to the second area-1 121, in the second area-1 121. In this instance, the electronic device 100 may add the tag 460, which have moved to the second area-1 121, to the content 410 and the content 420 selected in the first area 110.

FIGS. 5A and 5B are diagrams illustrating a situation in which, when a tag that is not included in all of a plurality of contents is selected, the plurality of contents including the corresponding tag is indicated in an electronic device according to various embodiments of the present disclosure.

Referring to FIG. 5A, the electronic device 100 may display the tag input user interface 101 in the display 10. According to an embodiment, the tag input user interface 101 for inputting tag information may include the first area 110, the second area 120, and the third area 130. According to various embodiments, the second area 120 may include second area-1 121 and second area-2 122.

According to an embodiment, the electronic device 100 may display, in the second area 120, a tag included in content that a user selects in the first area 110.

When a plurality of contents are selected in the first area 110, the electronic device 100 may distinguish and display, in the second area 120, tags commonly included in the content 510 and the content 520 and tags respectively and exclusively included in the content 510 and the content 520. For example, the electronic device 100 may display, in the second area-1 121, a "Happy" tag 530 and a "Family" tag 540 that are commonly included in the content 510 and 520 selected in the first area 110. Also, the electronic device 100 may display, in the second area-2 122, a "Central park" tag 560 and a "Koala" tag 550 that are respectively and exclusively included in the content 510 and 520 selected in the first area 110.

Referring to FIG. 5B, the electronic device 100 may display the content 520 including the selected tag 550, to be distinguished from the other content 510 among the content 510 and the content 520 selected in the first area 110, based on a signal input for selecting the tag located in the second area-2 122.

For example, the user may select the "Koala" tag 550 from among the tags displayed in the second area-2 122. The user may touch the tag displayed in the second area-2 122 to select the same, or may select the tag displayed in the second area-2 122 using a physical key separately provided in the electronic device 100.

In this instance, the electronic device 100 may display a dot 521 on the content 520 including the "Koala" tag 550 among the content 510 and the content 520 selected in the first area 110. However, the method of distinguishing and displaying content may not be limited thereto. For example, the electronic device 100 may blur the content 520 having the "Koala" tag 550, or may more clearly display the content 520 than the other content 510.

As described above, according to various embodiments of the present disclosure, by selecting a tag, a user can easily identify content including the selected tag.

FIGS. 6A and 6B are diagrams illustrating a situation of adding tags, which have been respectively and exclusively included in a plurality of contents, to the plurality of contents in the electronic device according to various embodiments of the present disclosure.

Referring to FIG. 6A, the electronic device 100 may display the tag input user interface 101 in the display 10. According to an embodiment, the tag input user interface 101 for inputting tag information may include the first area 110, the second area 120, and the third area 130. According to various embodiments, the second area 120 may include second area-1 121 and second area-2 122.

According to an embodiment, the electronic device 100 may display, in the second area 120, a tag included in content that a user selects in the first area 110.

When a plurality of contents are selected in the first area 110, the electronic device 100 may distinguish and display, in the second area 120, tags commonly included in the content 610 and the content 620 and tags respectively and exclusively included in the content 610 and the content 620. For example, the electronic device 100 may display, in the second area-1 121, a "Happy" tag 630 and a "Family" tag 640 that are commonly included in the content 610 and 620 selected in the first area 110. Also, the electronic device 100 may display, in the second area-2 122, a "Central park" tag 660 and a "Koala" tag 650 that are respectively and exclusively included in the content 610 and 620 selected in the first area 110.

According to an embodiment, the electronic device 100 may add, to the content 610 and the content 620 selected in the first area 110, a tag that is moved based on a signal input for moving a tag located in the second area-2 122 to the second area-1 121.

For example, the user may select the "Central part" tag 660 from among the tags displayed in the second area-2 122. The user may touch the tag displayed in the second area-2 122 to select the same, or may select the tag displayed in the second area-2 122 using a physical key separately provided in the electronic device 100.

Referring to FIG. 6B, the user may touch-and-drag the selected "Central park" tag 660 to move the same to the second area-1 121. In this instance, the electronic device 100 may add the "Central park" tag 660 to the content 620 which does not include the "Central park" tag 660 from among the content 610 and the content 620 selected in the first area 10.

FIGS. 7A and 7B are diagrams illustrating another method for moving a tag in an electronic device according to various embodiments of the present disclosure.

Referring to FIG. 7A, the electronic device 100 may display a tag input user interface 101 in the display 10. According to an embodiment, the tag input user interface 101 for inputting tag information may include the first area 110, the second area 120, and the third area 130. According to various embodiments, the second area 120 may include second area-1 121 and second area-2 122.

According to an embodiment, the electronic device 100 may display, in the second area 120, a tag included in content that a user selects in the first area 110.

When a plurality of contents are selected in the first area 110, the electronic device 100 may distinguish and display, in the second area 120, tags commonly included in the content 710 and the content 720 and tags respectively and exclusively included in the content 710 and the content 720. For example, the electronic device 100 may display, in the second area-1 120, a "Happy" tag 730 and a "Family" tag 740 that are commonly included in the content 710 and 720 selected in the first area 110. Also, the electronic device 100 may display, in the second area-2 122, a "Central park" tag 760 and a "Koala" tag 750 that are respectively and exclusively included in the content 710 and 720 selected in the first area 110.

According to various embodiments, the electronic device 100 may display an icon for moving a tag to each of the second area-1 121, the second area-2 122, and the third area 130. For example, the electronic device 100 may move a selected tag in each direction by using an icon 770 provided in the form of an arrow.

Referring to FIG. 7B, upon selecting the "Central park" tag 760 located in the second area-2 122 and selecting the icon 770 for the movement to the second area-1 121, the electronic device 100 moves the "Central park" tag 760 from the second area-2 122 to the second area-1 121 and displays the same.

Referring to FIG. 7B, the electronic device 100 may move the "Central park" tag 760 to the second area-1 121, and may display the same. In this instance, the electronic device 100 may add the "Central park" tag 760 to the content 720 which does not include the "Central park" tag 760 among the content 710 and the content 720 selected in the first area 110.

Figures 8A, 8B, 8C:
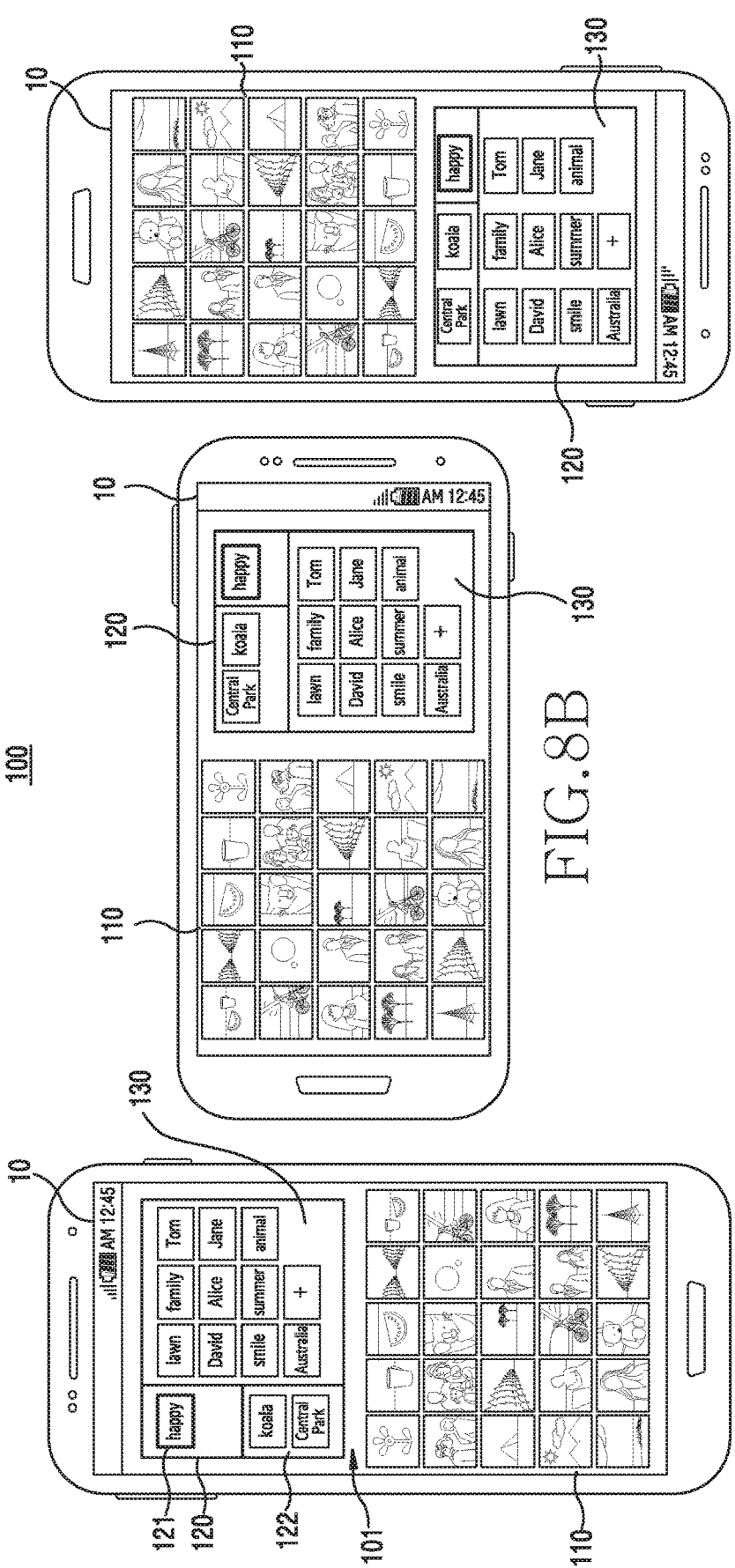
FIGS. 8A, 8B, and 8C are diagrams illustrating a situation of changing a tag input user interface based on the state of an electronic device, and displaying the changed user interface according to various embodiment of the present disclosure.

FIGS. 8A, 8B, and 8C are diagrams illustrating a situation of changing a tag input user interface based on the state of an electronic device, and displaying the changed user interface according to various embodiments of the present disclosure.

Referring to FIG. 8A, the electronic device 100 may display the tag input user interface 101 in the display 10. According to an embodiment, the tag input user interface 101 for inputting tag information may include the first area 110, the second area 120, and the third area 130. According to various embodiments, the second area 120 may include second area-1 121 and second area-2 122.

According to an embodiment, the electronic device 100 may recognize a rotation state, and display the first area 110, the second area 120, and the third area 130 in the display 10 by changing the locations thereof. For example, the electronic device 100 may recognize the rotation state using a gyro sensor, an acceleration sensor, and the like.

Referring to FIG. 8B, the electronic device 100 may rotate clockwise by 90 degrees. The electronic device 100 may recognize a rotation state, and may display the first area 110, the second area 120, and the third area 130 in the display 10 by changing the locations thereof.

For example, the electronic device 100 may display the first area in a left portion of the display 10, and may display the second area 120 and the third area 130 in a right portion of the display 10.

Referring to FIG. 8C, the electronic device 100 may rotate clockwise by 180 degrees. The electronic device 100 may recognize a rotation state, and may display the first area 110, the second area 120, and the third area 130 in the display 10 by changing the locations thereof.

For example, the electronic device 100 may display the first area 110 in an upper portion of the display 10, and may display the second area 120 and the third area 130 in a lower portion of the display 10.

However, a change made in the disposition of the first area 110, the second area 120, and the third area 130 based on the rotation of the electronic device 100 may not be limited thereto, and may include various configurations.

According to various embodiments, when the electronic device 100 displays the tag input user interface 101 in the display 10, the electronic device 100 may display the first area 110 in an upper portion of the display 10, and may display the second area 120 and the third area 130 below the first area 10, as shown in FIG. 8C.

In this instance, when the electronic device 100 rotates clockwise by 90 degrees, the electronic device 100 may display the first area in a left portion of the display 10, and may display the second area 120 and the third area 130 in a right portion of the display 10, as shown in FIG. 8B. Also, when the electronic device 100 further rotates clockwise by 90 degrees, the electronic device 100 may display the second area 120 and the third area 130 in an upper portion of the display 10 and may display the first area 110 below the second area 120 and the third area 130, as shown in FIG. 8A.

As described above, the electronic device 100 may display the tag input user interface 101 in various configurations in the display 10.

Figures 9A, 9B:
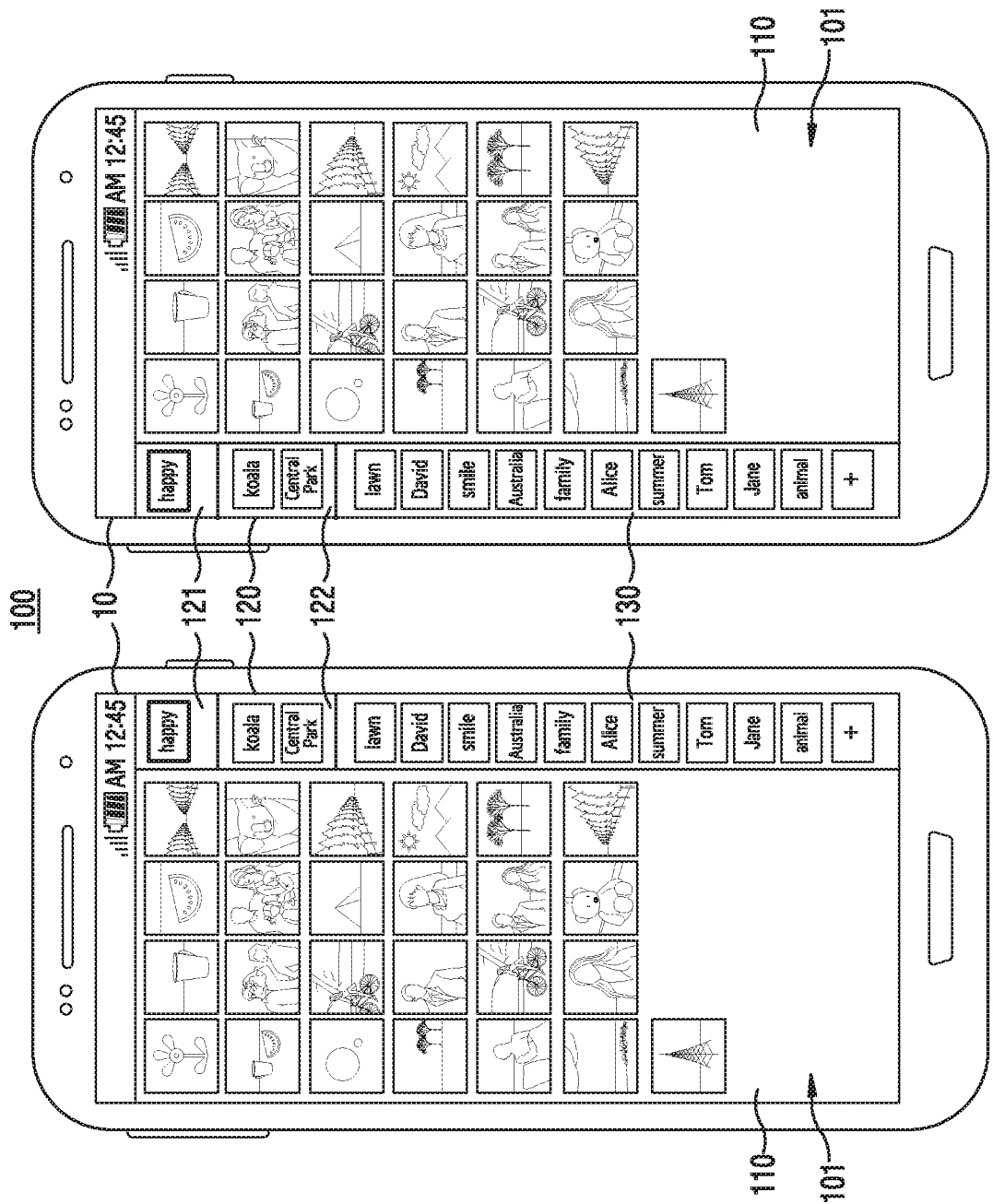
FIGS. 9A and 9B are diagrams illustrating another example of displaying a tag input user interface in an electronic device according to various embodiment of the present disclosure.

FIGS. 9A and 9B are diagrams illustrating another example of displaying a tag input user interface in an electronic device according to various embodiments of the present disclosure.

Referring to FIG. 9A, the electronic device 100 may display the tag input user interface 101 in the display 10. According to an embodiment, the tag input user interface 101 for inputting tag information may include the first area 110, the second area 120, and the third area 130. According to various embodiments, the second area 120 may include the second area-1 121 and the second area-2 122.

The first area 110 may be an area in which various pieces of content may be displayed. For example, the electronic device 100 may display, in the first area 110, image files, video files, music files, or the like stored in the electronic device 100.

The electronic device 100 may display, in the second area 120, a tag included in content that a user selects in the first area 110. When a plurality contents is selected in the first area 110, the electronic device 100 may distinguish and display, in the second area 120, tags commonly included in the plurality of contents and tags respectively and exclusively included in the plurality of contents.

According to an embodiment, the electronic device 100 may display a tag list in the third area 130. The electronic device 100 may display, in the third area 130, a tag which is determined to be related to the content that the user selects in the first area 110.

Referring to FIGS. 9A and 9B, the electronic device 100 may dispose the second area 120 and the third area 130 in a line at the left edge or the right edge of the display 10. Therefore, the electronic device 100 may display a greater number of contents in the first area 110.

Figure 10B:
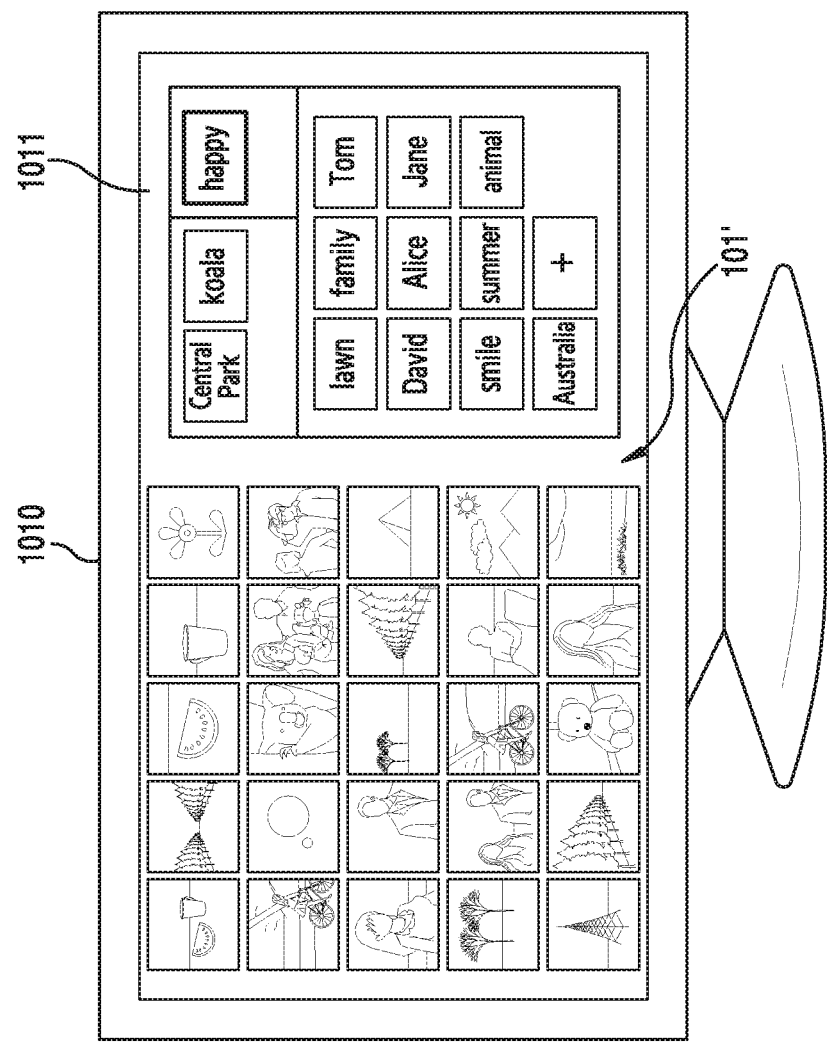
FIGS. 10A and 10B are diagrams illustrating an example of displaying a tag input user interface using a plurality of electronic devices according to various embodiment of the present disclosure.
Figure 10A:
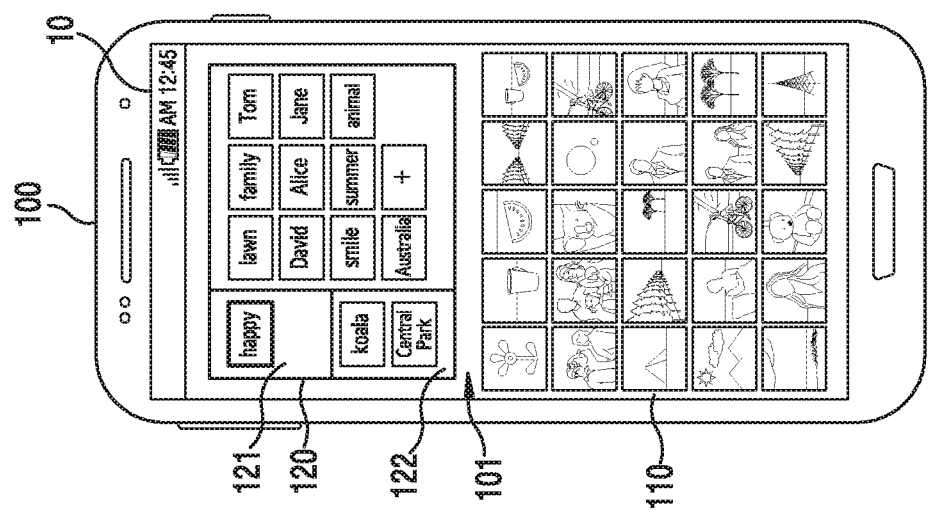

FIGS. 10A and 10B are diagrams illustrating an example of displaying a tag input user interface using a plurality of electronic devices according to various embodiments of the present disclosure.

Referring to FIG. 10A, the electronic device 100 may display the tag input user interface 101 in the display 10. According to an embodiment, the tag input user interface 101 for inputting tag information may include the first area 110, the second area 120, and the third area 130. According to various embodiments, the second area 120 may include second area-1 121 and second area-2 122.

Referring to FIG. 10B, another electronic device 1010 may display a user interface 101' which is the same as or similar to the tag input user interface displayed in the electronic device 100. For example, when the electronic device 100 is a small portable electronic device, the electronic device 1010 may be an electronic device having a relatively large display, such as a TV or a monitor.

The electronic device 100 and the electronic device 1010 may mutually establish communication. For example, the electronic device 100 and the electronic device 1010 may mutually exchange data using wired or wireless communication.

According to an embodiment, contents displayed in the tag input user interface 101 of the electronic device 100 may be also displayed in a display 1011 of the electronic device 1010 in the same manner or a similar manner. According to another embodiment, the electronic device 1010 may change the configuration of the tag input user interface 101 displayed in the electronic device 100 in consideration of the screen ratio or the screen size of the display 1011, and may display the same in the display 1011.

When a user moves a tag or content displayed in the electronic device 100, the electronic device 1010 may also move the same tag or content. Therefore, when a user is close to an electronic device having a large display, the user may easily input or correct a tag using the electronic device having a large display.

Figures 11A, 11B:
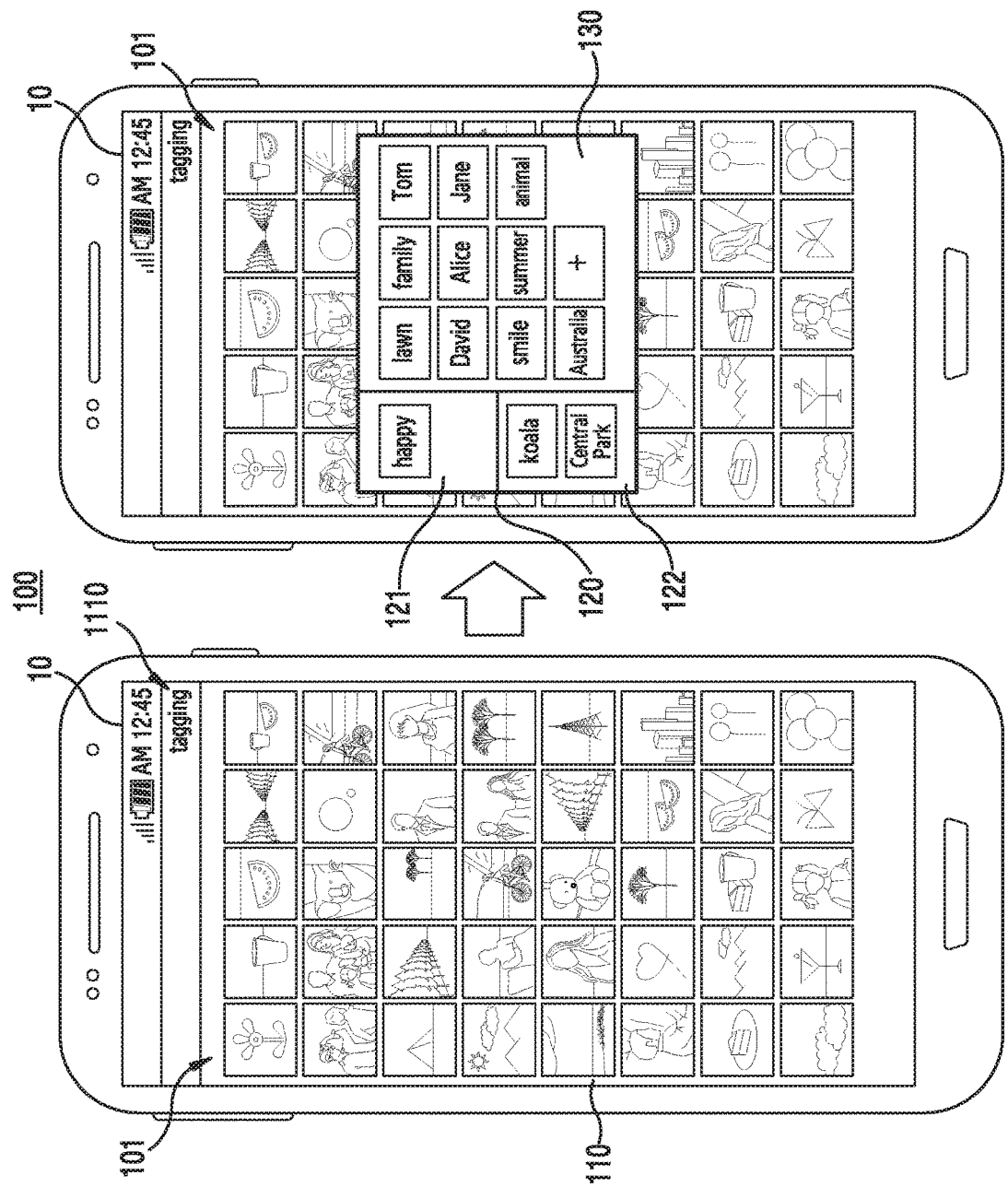

FIGS. 11A and 11B are diagrams illustrating examples of displaying a tag input user interface using an electronic device according to various embodiments of the present disclosure.

Referring to FIGS. 11A to 13B, the electronic device 100 may display the tag input user interface 101 in the display 10. According to an embodiment, the tag input user interface 101 for inputting tag information may include the first area 110, the second area 120, and the third area 130. According to various embodiments, the second area 120 may include the second area-1 121 and the second area-2 122.

Referring to FIG. 11A, the electronic device 100 may display the first area 110 in the display 10. The electronic device 100 may display, for example, a tag input start icon 1110 on the top of the display 10. The user may input a tag, or may select content that the user desires to change, and select the tag input icon 1110.

Referring to FIG. 11B, the electronic device 100 may display the second area 120 and the third area 130 in the display 10 based on a signal input for selecting the tag input start icon 1110. For example, the electronic device 100 may overlappingly display the second area 120 and the third area 130 on the first area 110.

The electronic device 100 may change the locations of the second area 120 and the third area 130 based on a signal input of from user for moving the second area 120 and the third area 130. For example, the user may change the locations of the second area 120 and the third area 130, by long-touching and dragging the second area 120 and the third area 130. However, the method of moving the second area 120 and the third area 130 may not be limited thereto.

Figures 12A, 12B:
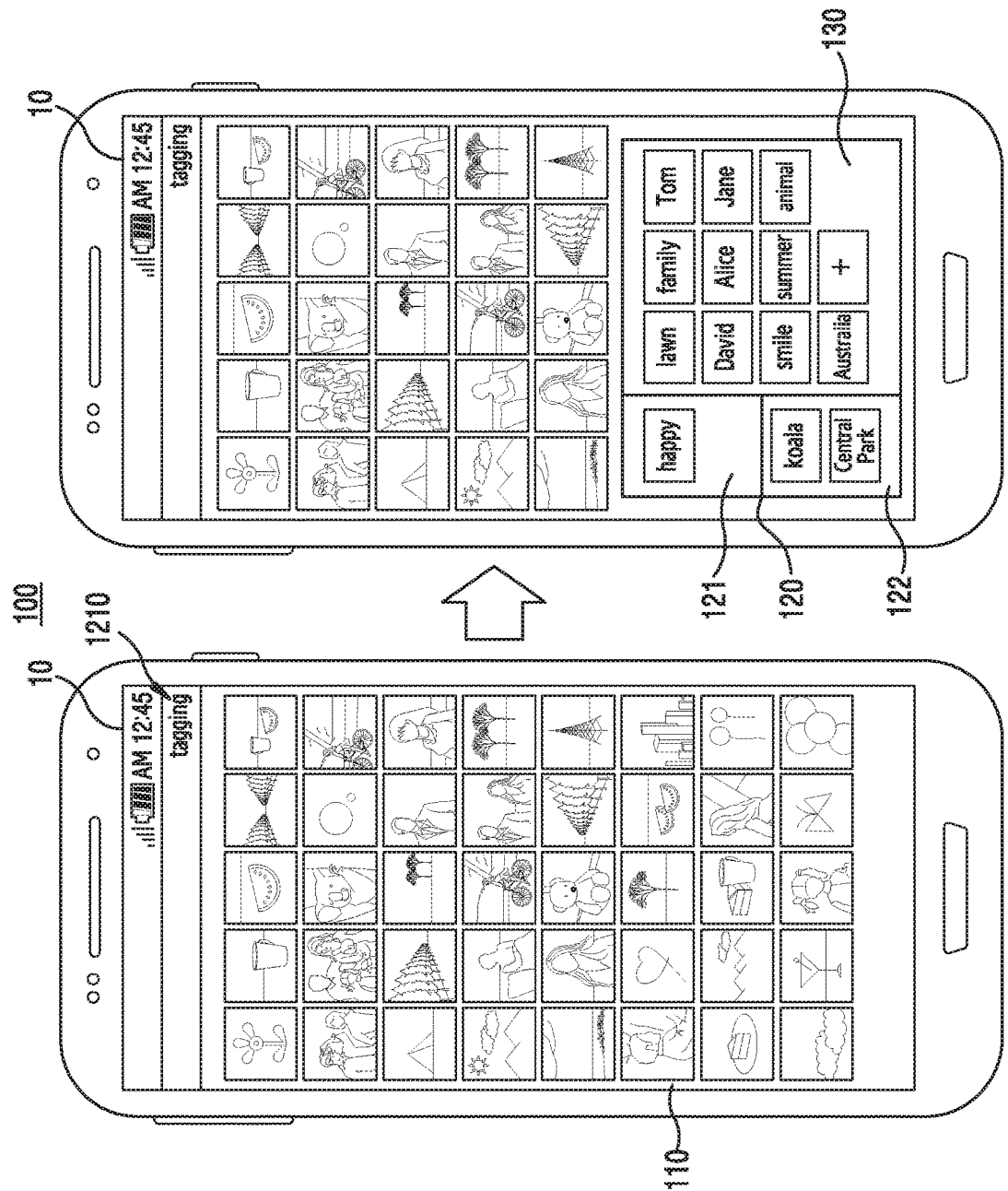

FIGS. 12A and 12B are diagrams illustrating examples of displaying a user interface for a tag input using an electronic device according to various embodiments of the present disclosure.

Referring to FIG. 12A, the electronic device 100 may display the first area 110 in the display 10. The electronic device 100 may display, for example, a tag input start icon 1210 on the top of the display 10. The user may input a tag, or may select content that the user desires to change, and select the tag input icon 1210.

Referring to FIG. 12B, the electronic device 100 may display the second area 120 and the third area 130 in the display 10, based on a signal input for selecting the tag input start icon 1210. For example, the electronic device 100 may display the second area 120 and the third area 130 in a lower portion of the display 10 by reducing an area occupied by the first area 110. The location where the second area 120 and the third area 130 are displayed may not be limited thereto.

FIGS. 13A and 13B are diagrams illustrating examples of displaying a user interface for a tag input using an electronic device according to various embodiments of the present disclosure.

Referring to FIG. 13A, the electronic device 100 may display the first area 110 in the display 10. The electronic device 100 may display, for example, a second area-and-third area-display icon 1310 in a lower portion of the display 10. The user may input a tag, or may select content that the user desires to change and select the second area-and-third area display icon 1310.

Referring to FIG. 13B, the electronic device 100 may display the second area 120 and the third area 130 in the display 10 based on a signal input for selecting the second area-and-third area display icon 1310. For example, the electronic device 100 may display the second area 120 and the third area 130 in a lower portion of the display 10 by reducing an area occupied by the first area 110.

According to an embodiment, the electronic device 100 may display a second area-and-third area display end icon 1320. Based on a signal input for selecting the icon 1320, the electronic device 100 may display the first area 10 in the display 10 as shown in FIG. 13A.

Figure 14:
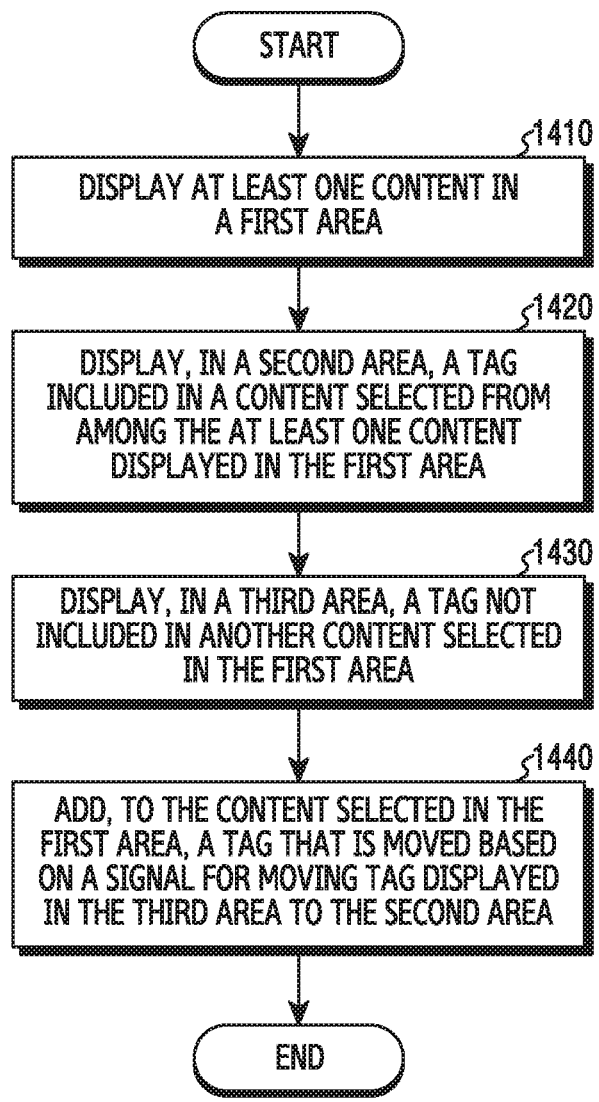
FIG. 14 is a flowchart illustrating a situation of displaying a tag input user interface and inputting a tag in an electronic device according to various embodiments of the present disclosure.

FIG. 14 is a flowchart illustrating a situation of displaying a tag input user interface and inputting a tag in an electronic device according to various embodiments of the present disclosure.

In operation 1410, the electronic device 100 displays a tag for receiving a user input on a user interface, and displays at least one content in a first area from among a plurality of areas included in the user interface. The at least one content may be stored in advance in the electronic device 100 or downloaded from an external electronic device.

In operation 1420, the electronic device 100 displays, in a second area of the display, a tag included (or related) in a content (or regarding a content) selected from among the at least one content displayed in the first area.

In operation 1430, the electronic device 100 displays, in a third area, a tag that is not included (or related) in the content selected in the first area. Although a tag displayed in the third area is not included in the content selected in the first area, the tag may be related to the content. The tag related to the content may be, for example, a tag that is classified in advance by an SNS application that drives a tag for receiving a user input on a user interface, a tag that is frequently added by a user, a tag that the user directly generates, a tag generated through analysis of content, or a tag frequently generated by other users who use the SNS application that drives the tag input user interface.

In operation 1440, the electronic device 100 may add, to the content selected in the first area, a tag that is moved based on an input for moving the tag displayed in the third area to the second area.

Figure 15:
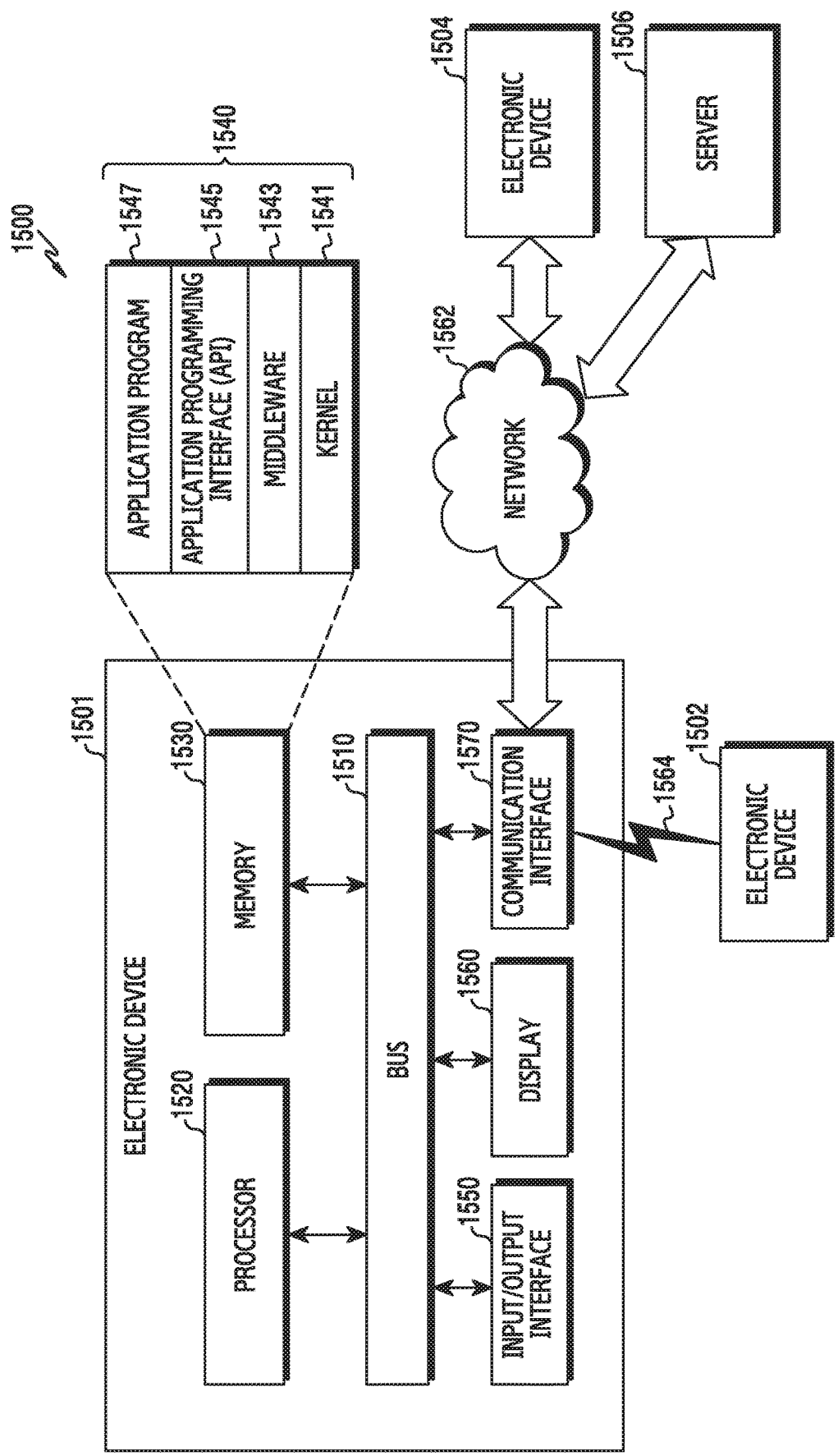
FIG. 15 is a diagram illustrating an electronic device in a network environment according to various embodiments of the present disclosure.

An electronic device 1501 within a network environment 1500, according to various embodiments, will be described with reference to FIG. 15. The electronic device 1501 may include the electronic device 100 of FIG. 1. The electronic device 1501 may include a bus 1510, a processor 1520, a memory 1530, an input/output interface 1550, a display 1560, and a communication interface 1570. In some embodiments, the electronic device 1501 may omit at least one of the elements, or may further include other elements. The bus 1510 may connect elements 1510 to 1570, and may include a circuit for delivering communication (e.g., a control message or data) between elements. The processor 1520 may include one or more of a CPU, an AP, and a communication processor (CP). The processor 1520, for example, may carry out operations or data processing relating to the control and/or communication of at least one other element of the electronic device 1501.

The memory 1530 may include a volatile and/or non-volatile memory. The memory 1530 may store, for example, instructions or data relevant to at least one other element of the electronic device 1501. According to an embodiment, the memory 1530 may store software and/or a program 1540.

The program 1540 may include, for example, a kernel 1541, middleware 1543, an application programming interface (API) 1545, and/or application programs (or "applications") 1547. At least a part of the kernel 1541, the middleware 1543, or the API 1545 may be referred to as an OS. The kernel 1541 may control or manage, for example, system resources (e.g., the bus 1510, the processor 1520, the memory 1530, or the like) used for executing operations or functions implemented in other programs (e.g., the middleware 1543, the API 1545, or the application programs 1547). Furthermore, the kernel 1541 may provide an interface through which the middleware 1543, the API 1545, or the application programs 1547 may access the individual elements of the electronic device 1501 to control or manage the system resources.

The middleware 1543 may function as, for example, an intermediary for allowing the API 1545 or the application programs 1547 to communicate with the kernel 1541 to exchange data. Furthermore, the middleware 1543 may process one or more task requests, which are received from the application programs 1547, according to priorities thereof. For example, the middleware 1543 may assign, to at least one of the application programs 1547, a priority to use a system resource of the electronic device 1501 (e.g., the bus 1510, the processor 1520, the memory 1530, or the like), and may process the one or more task requests. The API 1545 is an interface used by the application 1547 to control a function provided from the kernel 1541 or the middleware 1543, and may include, for example, at least one interface or function (e.g., an instruction), for a file control, a window control, image processing, a text control, or the like. For example, the input/output interface 1550 may forward an instruction or data, which is input from a user or an external device, to the other element(s) of the electronic device 1501, or may output an instruction or data, which is received from the other element(s) of the electronic device 1501, to the user or the external device.

The display 1560 may include, for example, a LCD, a LED display, an OLED display, a MEMS display, or an electronic paper display. The display 1560 may display various information (e.g., text, images, videos, icons, and/or symbols) to a user. The display 1560 may include a touch screen and may receive, for example, a touch, gesture, proximity, or hovering input using an electronic pen or the user's body part. The communication interface 1570 may establish communication between the electronic device 1501 and an external device (e.g., a first external electronic device 1502, a second external electronic device 1504, or a server 1506). For example, the communication interface 1570 may be connected to the network 1562 through wireless communication or wired communication, and may communicate with an external device (e.g., the second external electronic device 1504 or the server 1506). In another example, the communication interface 1570 may be connected to the second external electronic device 1504 through a wireless communication 1564.

The wireless communication may include, for example, a cellular communication that uses at least one of long term evolution (LTE), LTE-Advanced (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of wireless fidelity (Wi-Fi), bluetooth (BT), BT low energy (BLE), Zigbee, near field communication (NFC), magnetic secure transmission, radio frequency (RF), and body area network (BAN). According to an embodiment, the wireless communication may include a GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the "GPS" may be interchangeably used with the "GNSS". The wired communication may include, for example, at least one of a universal serial bus (USB), a high definition multimedia interface (HDMI), recommended standard 232 (RS-232), power line communication, and a plain old telephone service (POTS). The network 1562 may include a telecommunication network, for example, at least one of a computer network (e.g., local area network (LAN) or wide area network (WAN)), the Internet, and a telephone network.

Each of the first and second external electronic devices 1502 and 1504 may be of a type same as or different from the electronic device 1501. According to various embodiment, all or a part of operations executed in the electronic device 1501 may be performed by another one or a plurality of electronic devices (e.g., the electronic devices 1502 and 1504, or the server 1506). According to an embodiment, when the electronic device 1501 has to perform some functions or services automatically or in response to a request, the electronic device 1501 may request another device (e.g., the electronic device 1502 or 1504 or the server 1506) to perform at least some functions relating thereto, instead of, or in addition to, performing the functions or services by itself. The other electronic device (e.g., the electronic device 1502 or 1504, or the server 1506) may execute a requested function or an additional function, and may transfer a result to the electronic device 1501. The electronic device 1501 may provide the received result as it is, or may additionally process the received result to provide the requested functions or services. To this end, for example, cloud computing, distributed computing, or client-server computing technology may be used.

Figure 16:
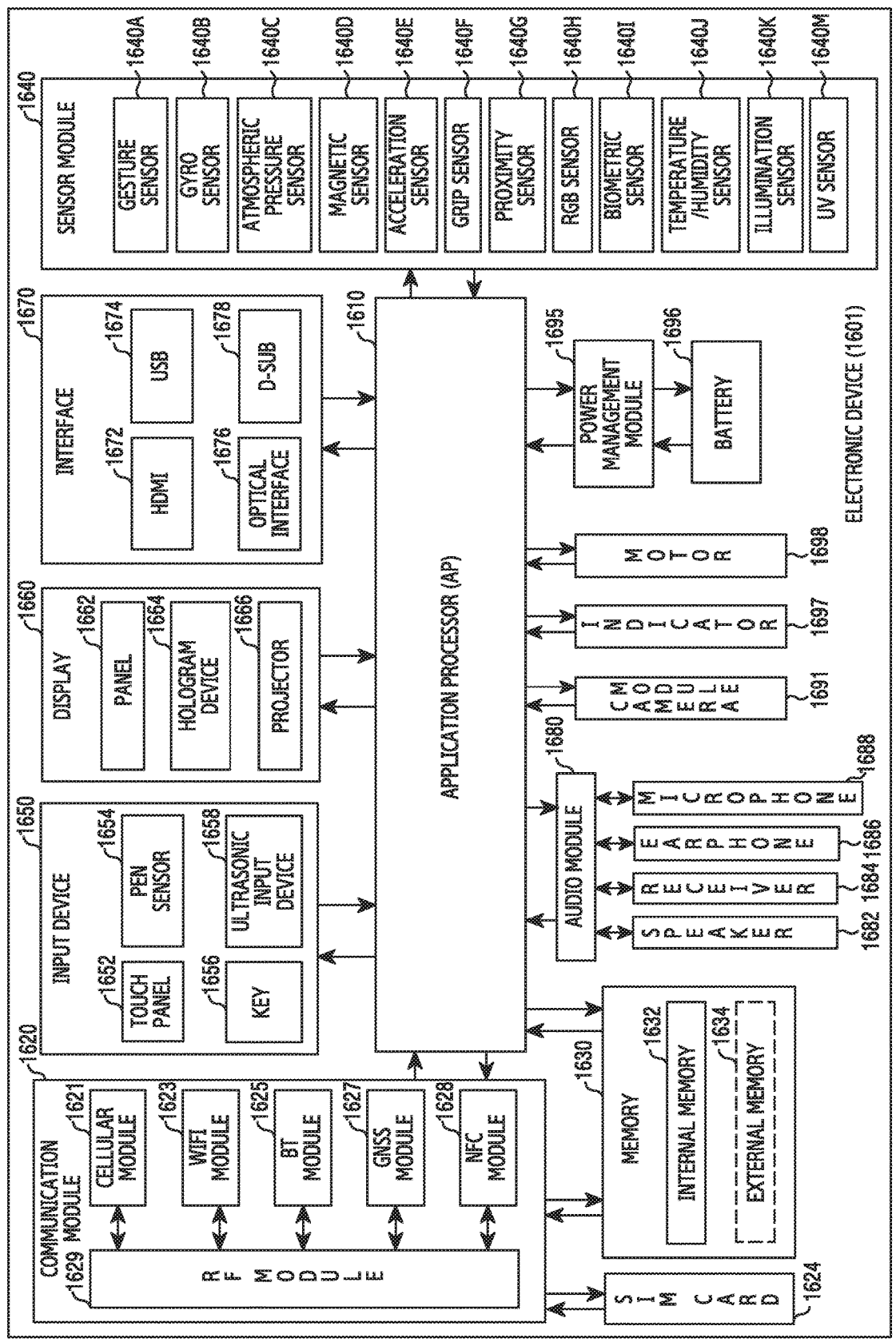
FIG. 16 is a block diagram of an electronic device according to various embodiments of the present disclosure.

FIG. 16 is a block diagram of an electronic device 1601 according to various embodiments of the present disclosure. For example, the electronic device 1601 may include a part or the entirety of the electronic device 100 illustrated in FIG. 1 and the electronic device 1501 of FIG. 15. The electronic device 1601 may include one or more processors (e.g., AP) 1610, a communication module 1620, a subscriber identification module 1624, a memory 1630, a sensor module 1640, an input device 1650, a display 1660, an interface 1670, an audio module 1680, a camera module 1691, a power management module 1695, a battery 1696, an indicator 1697, and a motor 1698. The processor 1610 may control a plurality of hardware or software elements connected thereto and may perform various data processing and operations by driving an OS or an application program. The processor 1610 may be embodied, for example, as a system on chip (SoC). According to an embodiment, the processor 1610 may further include a graphic processing unit (GPU) and/or an image signal processor (ISP). The processor 1610 may include at least a part (e.g., cellular module 1621) of the elements illustrated in FIG. 16. The processor 1610 may load an instruction or data received from at least one of other elements (e.g., a non-volatile memory) in a volatile memory, may process the instruction or data, and may store resultant data in a non-volatile memory.

The communication module 1620 may have a configuration same as or similar to that of the communication interface 1570. The communication module 1620 may include, for example, a cellular module 1621, a Wi-Fi module 1623, a BT module 1625, a GNSS module 1627, an NFC module 1628, and an RF module 1629. The cellular module 1621 may provide, for example, a voice call, a video call, a text message service, an Internet service, or the like through a communication network. According to an embodiment, the cellular module 1621 may distinguish and authenticate the electronic device 1601 in a communication network using a subscriber identification module (SIM) (e.g., a SIM card) 1624. According to an embodiment, the cellular module 1621 may perform at least some of the functions that the processor 1610 may provide. According to an embodiment, the cellular module 1621 may include a CP. According to an embodiment, at least some (e.g., two or more) of the cellular module 1621, the Wi-Fi module 1623, the BT module 1625, the GNSS module 1627, and the NFC module 1628 may be included in a single integrated chip (IC) or IC package. The RF module 1629 may transmit and receive, for example, a communication signal (e.g., an RF signal). The RF module 1629 may include, for example, a transceiver, a power amp module (PAM), a frequency filter, a low noise amplifier (LNA), an antenna, or the like. According to another embodiment, at least one of the cellular module 1621, the Wi-Fi module 1623, the BT module 1625, the GNSS module 1627, and the NFC module 1628 may transmit/receive an RF signal through a separate RF module. The subscriber identification module 1624 may include, for example, a card including a subscriber identification module or an embedded SIM, or may include unique identification information (e.g., integrated circuit card identifier (ICCID)) or subscriber information (e.g., international mobile subscriber identity (IMSI)).

The memory 1630 (e.g., the memory 1530) may include, for example, an internal memory 1632 or an external memory 1634. The internal memory 1632 may include, for example, at least one of a volatile memory (e.g., dynamic random-access memory (DRAM), static RAM (SRAM), synchronous dynamic RAM (SDRAM), or the like), a non-volatile memory (e.g., onetime programmable read-only memory (ROM) (OTPROM), PROM, EPROM, EEPROM, mask ROM, flash ROM, a flash memory, a hard drive, a solid state drive (SSD)). The external memory 1634 may include a flash drive, for example, a compact flash (CF), a secure digital (SD), a Micro-SD, a Mini-SD, an extreme digital (xD), a multi-media card (MMC), a memory stick, and the like. The external memory 1634 may be functionally and/or physically connected to the electronic device 1601 through various interfaces.

The sensor module 1640 may, for example, measure a physical quantity or detect the operating state of the electronic device 1601 and may convert the measured or detected information into an electrical signal. The sensor module 1640 may include, for example, at least one of a gesture sensor 1640A, a gyro sensor 1640B, an atmospheric pressure sensor 1640C, a magnetic sensor 1640D, an acceleration sensor 1640E, a grip sensor 1640F, a proximity sensor 1640G, a color sensor 1640H (e.g., an red, green, and blue (RGB) sensor), a biometric sensor 1640I, a temperature/humidity sensor 1640J, an illumination sensor 1640K, and an ultraviolet (UV) sensor 1640M. Additionally or alternatively, the sensor module 1640 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1640 may further include a control circuit for controlling one or more sensors included therein. In some embodiments, the electronic device 1601 may further include a processor, which is configured to control the sensor module 1640, as a part of the processor 1610 or separately from the processor 1610 in order to control the sensor module 1640 while the processor 1610 is in a sleep state.

The input device 1650 may include, for example, a touch panel 1652, a (digital) pen sensor 1654, a key 1656, or an ultrasonic input device 1658. The touch panel 1652 may use, for example, at least one of a capacitive type, a resistive type, an IR type, and an ultrasonic type. Furthermore, the touch panel 1652 may further include a control circuit. The touch panel 1652 may further include a tactile layer to provide a tactile reaction to a user. The (digital) pen sensor 1654 may include, for example, a recognition sheet that is a part of, or separated from, the touch panel. The key 1656 may include, for example, a physical button, an optical key, or a keypad. The ultrasonic input device 1658 may detect ultrasonic waves generated from an input device by using a microphone (e.g., the microphone 1688), and may identify data corresponding to the detected ultrasonic waves.

The display 1660 (e.g., the display 1560) may include a panel 1662, a hologram device 1664, a projector 1666, and/or a control circuit for controlling the same. The panel 1662 may be implemented to be, for example, flexible, transparent, or wearable. The panel 1662, together with the touch panel 1652, may be configured as one or more modules. According to an embodiment, the panel 1662 may include a pressure sensor (or a force sensor), which may measure the strength of pressure of a user's touch. The pressure sensor may be embodied integrated with the touch panel 1652 or embodied as one or more sensors separated from the touch panel 1652. The hologram device 1664 may show a three-dimensional (3D) image in the air by using an interference of light. The projector 1666 may display an image by projecting light onto a screen. The screen may be located, for example, inside or outside the electronic device 1601. The interface 1670 may include, for example, an HDMI 1672, a USB 1674, an optical interface 1676, or a D-subminiature (D-sub) 1678. The interface 1670 may be included, for example, in the communication interface 1570 illustrated in FIG. 15. Additionally or alternatively, the interface 1670 may include, for example, a mobile high-definition link (MHL) interface, an SD card/MMC interface, or an IR data association (IrDA) standard interface.

The audio module 1680, for example, may convert a sound into an electrical signal, and vice versa. At least some elements of the audio module 1680 may be included, for example, in the input/output interface 1550 illustrated in FIG. 15. The audio module 1680 may process sound information that is input or output through, for example, a speaker 1682, a receiver 1684, earphones 1686, the microphone 1688, and the like. The camera module 1691 is a device for capturing a still image or a video, and may include one or more image sensors (e.g., a front side sensor or a back-side sensor), a lens, an ISP, or a flash (e.g., an LED or xenon lamp). The power management module 1695 may manage, for example, the power of the electronic device 1601. According to an embodiment, the power management module 1695 may include a power management integrated circuit (PMIC), a charger IC, or a battery or fuel gauge. The PMIC may use a wired and/or wireless charging method. The wireless charging method may include, for example, a magnetic resonance scheme, a magnetic induction scheme, or an electromagnetic scheme, and may further include an additional circuit for wireless charging, such as a coil loop circuit, a resonance circuit, a rectifier circuit, and the like. The battery gauge may measure, for example, the amount of charge remaining in the battery 1696, and the voltage, the current, or the temperature during charging. The battery 1696 may include, for example, a rechargeable battery and/or a solar battery.

The indicator 1697 may display a predetermined state of the electronic device 1601 or part of the electronic device 1601 (for, the processor 1610), such as a boot-up state, a message state, a charging state, or the like. The motor 1698 may convert an electrical signal into a mechanical vibration and may generate a vibration, a haptic effect, or the like. The electronic device 1601 may include a mobile TV support device (e.g., a GPU) that can process media data according to a standard, such as digital multimedia broadcasting (DMB), digital video broadcasting (DVB), mediaFlo™, or the like. Each of the above-described elements of the present disclosure may be configured by including one or more components, and the names of the corresponding elements may vary based on the type of electronic device. In various embodiments, an electronic device (e.g., the electronic device 1601) may omit some elements or may further include additional elements, or some of the elements of the electronic device may be coupled to each other to configure one entity, wherein the entity may perform the functions same as those of the corresponding elements prior to the coupling.

Figure 17:
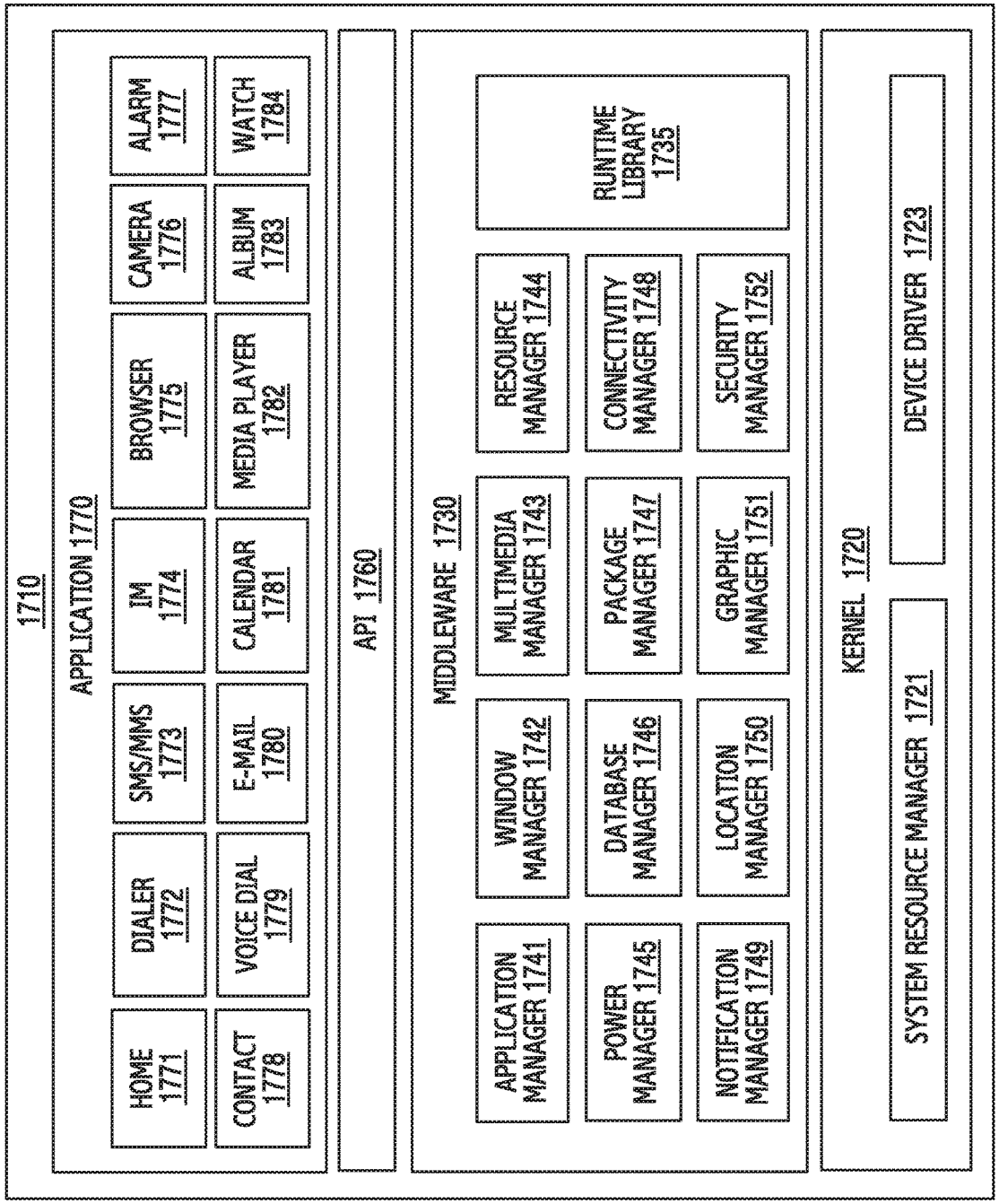
FIG. 17 is a block diagram of a program module according to various embodiments of the present disclosure.

FIG. 17 is a block diagram of a program module according to various embodiments of the present disclosure. According to an embodiment, the program module 1710 (e.g., the program 1540) may include an OS that controls resources relating to an electronic device (e.g., the electronic device 1501 or the electronic device 100) and/or various applications (e.g., the application programs 1547) that are driven on the OS. The OS may include, for example, Android™, iOS™, Windows™ Symbian™, Tizen™, or Bada™. Referring to FIG. 17, the program module 1710 may include a kernel 1720 (e.g., the kernel 1541), middleware 1730 (e.g., the middleware 1543), an API 1760 (e.g., the API 1545), and/or applications 1770 (e.g., the application programs 1547). At least a part of the program module 1710 may be preloaded on an electronic device, or may be downloaded from an external electronic device (e.g., the electronic device 1502 or 1504 or the server 1506).

The kernel 1720 may include, for example, a system resource manager 1721 and/or a device driver 1723. The system resource manager 1721 may control, allocate, or retrieve system resources. According to an embodiment, the system resource manager 1721 may include a process manager, a memory manager, or a file system manager. The device driver 1723 may include, for example, a display driver, a camera driver, a BT driver, a shared memory driver, a USB driver, a keypad driver, a Wi-Fi driver, an audio driver, or an interprocess communication (IPC) driver. For example, the middleware 1730 may provide a function required by the applications 1770 in common, or may provide various functions to the applications 1770 through the API 1760 to enable the applications 1770 to use the limited system resources within the electronic device. According to an embodiment, the middleware 1730 may include at least one of a runtime library 1735, an application manager 1741, a window manager 1742, a multi-media manager 1743, a resource manager 1744, a power manager 1745, a database manager 1746, a package manager 1747, a connectivity manager 1748, a notification manager 1749, a location manager 1750, a graphic manager 1751, and a security manager 1752.

The runtime library 1735 may include, for example, a library module that a compiler uses in order to add a new function through a programming language while the applications 1770 are being executed. The runtime library 1735 may perform input/output management, memory management, or arithmetic function processing. The application manager 1741 may manage, for example, the life cycles of the applications 1770. The window manager 1742 may manage graphical user interface (GUI) resources used for a screen. The multimedia manager 1743 may identify formats required for reproducing various media files and may encode or decode a media file using a codec suitable for a corresponding format. The resource manager 1744 may manage the source codes of the applications 1770 or memory space. The power manager 1745 may manage, for example, the capacity or power of a battery and may provide power information required for operating the electronic device. According to an embodiment, the power manager 1745 may interoperate with a basic input/output system (BIOS). The database manager 1746 may, for example, generate, search, or change databases to be used by the applications 1770. The package manager 1747 may manage the installation or update of an application that is distributed in the form of a package file.

The connectivity manager 1748 may manage, for example, a wireless connection. The notification manager 1749 may provide an event (e.g., an arrival message, an appointment, a proximity notification, and the like) to a user. The location manager 1750 may manage, for example, the location information of the electronic device. The graphic manager 1751 may manage, for example, a graphic effect to be provided to a user and a user interface relating to the graphic effect. The security manages 1752 may provide, for example, system security or user authentication. According to an embodiment, the middleware 1730 may include a telephony manager for managing a voice or video call function of the electronic device or a middleware module that is capable of forming a combination of the functions of the above-described elements. According to an embodiment, the middleware 1730 may provide modules specialized according to the types of operation systems. The middleware 1730 may dynamically remove some of the existing elements, or may add new elements. The API 1760 is, for example, a set of API programming functions, and may be provided in different configurations according to OSs. For example, in the case of Android or iOS, one API set may be provided for each platform, and in the case of Tizen, two or more API sets may be provided for each platform.

The applications 1770 may include applications that provide, for example, home 1771, a dialer 1772, an short message service (SMS)/multimedia messaging service (MMS) 1773, an instant message (IM) 1774, a browser 1775, a camera 1776, an alarm 1777, contacts 1778, a voice dial 1779, an e-mail 1780, a calendar 1781, a media player 1782, an album 1783, a watch 1784, healthcare (e.g., measuring exercise quantity or blood glucose), environment information (e.g., atmospheric pressure, humidity, or temperature information), and the like. According to an embodiment, the applications 1770 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update functions of an external electronic device that communicates with the electronic device (e.g., turning on/off the external electronic device itself (or some elements thereof) or adjusting the brightness (or resolution) of a display) or applications executed in the external electronic device. According to an embodiment, the application 1770 may include an application designated based on properties of an external electronic device (e.g., a healthcare application of a mobile medical device). According to an embodiment, the applications 1770 may include applications received from an external electronic device. At least some of the program module 1710 may be embodied (executed) as software, firmware, hardware (e.g., the processor 1610), or a combination of at least two of them, and may include a module, a program, a routine, an instruction set, or a process for implementing one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a non-transitory computer-readable storage medium (e.g., the memory 1530) in the form of a program module. The instruction, when executed by a processor (e.g., the processor 1520), may cause the one or more processors to execute the function corresponding to the instruction. The non-transitory computer-readable storage medium may include a hard disk, a floppy disk, a magnetic medium (e.g., a magnetic tape), an optical media (e.g., compact disc read only memory (CD-ROM), digital versatile disc (DVD)), a magneto-optical media (e.g., a floptical disk), an inner memory, etc. The instruction may include a code which is made by a compiler or a code which may be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   a memory storing instructions; and at least one processor electrically coupled with the display and the memory, configured to execute the instructions to:
in response to displaying a tag input user interface including a content area, a first tag area and a second tag area different from and adjacent to the first tag area, control to display multiple contents in the content area, wherein the content area, the first tag area and the second tag area are displayed in distinct portions within the display and the first tag area includes first tag area-1 and first tag area-2,
identify, in response to detecting a first input for selecting a first content and a second content among the multiple contents, a common tag that is allocated to the first content and the second content,
control to display, in response to the identification of the common tag, the common tag in the first tag area-1 and another tag that is allocated to the first content and not allocated to the second content in the first tag area-2,
identify a second input for dragging a second tag from the second tag area to the first tag area,
allocate, in response to the identification of the second input, the dragged second tag to the first content, wherein the dragged second tag is excluded from the second tag area and displayed in the first tag area, and
store, in response to the allocation of the dragged second tag to the first content, information regarding association between the dragged second tag and the first content.

2. The electronic device of claim 1, wherein the at least one processor is further configured to execute the instructions to:
identify a third input for dragging a first tag from the first tag area to the second tag area, and
release, in response to the identification of the third input, allocation between the first tag dragged by the third input and the first content, wherein the first tag dragged by the third input is excluded from the first tag area and displayed in the second tag area.

3. The electronic device of claim 1, wherein the at least one processor is further configured to:
identify another input for dragging the other tag from the first tag area-2 to the first tag area-1, and
allocate the other tag being dragged by the other input to the first content.

4. The electronic device of claim 1, wherein the at least one processor is further configured to execute the instructions to control to display a notification associated with the second content mapped to the other tag related to the first tag area-2, in response to detecting another input to select the other tag related to the first tag area-2.

5. The electronic device of claim 1, wherein the first tag area or the second tag area is overlappingly displayed on the content area.

6. The electronic device of claim 1, wherein the at least one processor is further configured to execute the instructions to extend the first tag area or the second tag area, in response to detecting an input to reduce the content area.

7. The electronic device of claim 1, wherein the at least one processor is further configured to execute the instructions to:
change a display mode of the electronic device, in response to detecting a designated movement of the electronic device; and
change a location of at least one of the content area, the first tag area, or the second tag area displayed in the display, based on change of the display mode.

8. The electronic device of claim 1, wherein the at least one processor is further configured to execute the instructions to:
display, within the second tag area, a visual element distinct from the multiple contents, and
display, in response to detecting a third input regarding the visual element, a user interface configured to add another tag in the second tag area that is distinct from the multiple contents.

9. The electronic device of claim 1, wherein the at least one second tag is at least one of a tag previously designated through a designated application, a tag that is used at least a predetermined number of times designated by a user of the electronic device, a tag generated by the user of the electronic device, a tag related to a feature of the selected at least one content, or a tag generated by users who use the designated application.

10. A method of an electronic device, the method comprising:
in response to displaying a tag input user interface including a content area, a first tag area and a second tag area different from and adjacent to the first tag area, displaying multiple contents in the content area, wherein the content area, the first tag area and the second tag area are displayed in distinct portions within a display of the electronic device and the first tag area includes first tag area-1 and first tag area-2;
identifying, in response to detecting a first input for selecting a first content and a second content among the multiple contents, a common tag that is allocated to the first content and the second content;
displaying, in response to the identification of the common tag, the common tag in the first tag area-1 and another tag that is allocated to the first content and not allocated to the second content in the first tag area-2;
identifying a second input for dragging a second tag from the second tag area to the first tag area;
allocating, in response to the identification of the second input, the dragged second tag to the first content, wherein the dragged second tag is excluded from the second tag area and displayed in the first tag area; and
storing, in response to the allocation of the dragged second tag to the first content, information regarding association between the dragged second tag and the first content.

11. The method of claim 10, further comprising:
identifying a third input for dragging a first tag from the first tag area to the second tag area; and
releasing, in response to the identification of the third input, allocation between the first tag dragged by the third input and the first content, wherein the first tag dragged by the third input is excluded from the second tag area and displayed as the second tag.

12. The method of claim 10, further comprising:
identifying another input for dragging the other tag from the first tag area-2 to the first tag area-1; and
allocating the other tag being dragged by the other input to the first content.

13. The method of claim 10, further comprising:
displaying a notification associated with the second content mapped to the other tag related to the first tag area-2, in response to detecting another input to select the other tag related to the first tag area-2.

14. The method of claim 10, wherein the first tag area or the second tag area is overlappingly displayed on the content area.

15. The method of claim 10, further comprising:
extending the first tag area or the second tag area, in response to detecting an input to reduce the content area.

16. The method of claim 10, further comprising:
changing a display mode of the electronic device, in response to detecting a designated movement of the electronic device; and
changing a location of at least one of the content area, the first tag area, or the second tag area displayed in the display, based on change of the display mode.

17. The method of claim 10, wherein the second tag is at least one of a tag previously designated through a designated application, a tag which is used at least a predetermined number of times designated by a user of the electronic device, a tag generated by the user of the electronic device, a tag related to a feature of the selected at least one content, or a tag generated by users who use the designated application.

18. A non-transitory computer readable storage medium storing instructions, which when executed by at least one processor of an electronic device, causes the at least one processor to:

in response to displaying a tag input user interface including a content area, a first tag area and a second tag area different from and adjacent to the first tag area, control to display multiple contents in the content area, wherein the content area, the first tag area and the second tag area are displayed in distinct portions within the display and the first tag area includes first tag area-1 and first tag area-2;

identifying, in response to detecting a first input for selecting a first content and a second content among the multiple contents, a common tag that is allocated to the first content and the second content;

displaying, in response to the identification of the common tag, tag in the first tag area-1, and another tag that is allocated to the first content and not allocated to the second content in the first tag area-2;

identify a second input for dragging a second tag from the second tag area to the first tag area;

allocate, in response to the identification of the second input, the dragged second tag to the first content, wherein the dragged second tag is excluded from the second tag area and displayed in the first tag area; and store, in response to the allocation of the dragged second tag to the first content, information regarding association between the dragged second tag and the first content.

* * * * *